United States Patent
You et al.

(10) Patent No.: US 12,225,437 B2
(45) Date of Patent: Feb. 11, 2025

(54) V2X COMMUNICATION METHOD AND V2X COMMUNICATIONS APPARATUS

(71) Applicant: HUAWEI TECHNOLOGIES CO., LTD., Guangdong (CN)

(72) Inventors: Chunhua You, Shanghai (CN); Qiang Fan, Hefei (CN); Jingrui Guo, Shanghai (CN); Xing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 547 days.

(21) Appl. No.: 17/181,727

(22) Filed: Feb. 22, 2021

(65) Prior Publication Data
US 2021/0176610 A1    Jun. 10, 2021

Related U.S. Application Data

(63) Continuation of application No. PCT/CN2019/101960, filed on Aug. 22, 2019.

(30) Foreign Application Priority Data

Aug. 23, 2018  (CN) .......................... 201810968896.0

(51) Int. Cl.
*H04W 4/40*   (2018.01)
*H04W 72/23*  (2023.01)
*H04W 72/56*  (2023.01)

(52) U.S. Cl.
CPC ............. *H04W 4/40* (2018.02); *H04W 72/23* (2023.01); *H04W 72/56* (2023.01)

(58) Field of Classification Search
None
See application file for complete search history.

(56) References Cited

U.S. PATENT DOCUMENTS

| | | |
|---|---|---|
| 2016/0295624 A1 | 10/2016 | Novlan et al. |
| 2018/0124648 A1* | 5/2018 | Park .................. H04W 36/0011 |
| 2018/0234973 A1 | 8/2018 | Lee et al. |
| 2018/0359735 A1* | 12/2018 | Lee ........................ H04W 72/23 |

(Continued)

FOREIGN PATENT DOCUMENTS

| | | |
|---|---|---|
| CN | 104754748 A | 7/2015 |
| CN | 105188045 A | 12/2015 |

(Continued)

OTHER PUBLICATIONS

Catt, "Discussion on 64QAM modulation scheme in V2X Phase 2," 3GPP TSG RAN WG1 Meeting #90bis, R1-1717791, Prague, Czechia, Oct. 9-13, 2017, 4 pages.

(Continued)

*Primary Examiner* — Saumit Shah
(74) *Attorney, Agent, or Firm* — Fish & Richardson P.C.

(57) ABSTRACT

This application provides an example vehicle to everything (V2X) communication method and an example V2X communications apparatus. According to the method, different transmission parameters can be selected for data packets corresponding to different services, ProSe per-packet priority (PPPP) of services, ProSe per-packet reliability (PPPR) of services, or quality of service flow identifiers (QFIs) based on service information of the data packets.

20 Claims, 8 Drawing Sheets

(56) References Cited

U.S. PATENT DOCUMENTS

| | | | | |
|---|---|---|---|---|
| 2019/0222404 | A1* | 7/2019 | Ang | H04L 5/0096 |
| 2019/0320467 | A1* | 10/2019 | Freda | H04W 74/004 |
| 2020/0008266 | A1* | 1/2020 | Pan | H04L 1/1642 |
| 2020/0178290 | A1* | 6/2020 | Lee | H04W 72/20 |
| 2021/0168814 | A1* | 6/2021 | Chen | H04W 72/02 |
| 2021/0175999 | A1* | 6/2021 | Kittichokechai | H04L 1/0016 |
| 2022/0039080 | A1* | 2/2022 | Khoryaev | H04W 4/40 |

FOREIGN PATENT DOCUMENTS

| | | |
|---|---|---|
| CN | 106162734 A | 11/2016 |
| CN | 107371182 A | 11/2017 |
| CN | 104429146 B | 12/2017 |
| CN | 107734704 A | 2/2018 |
| CN | 108271213 A | 7/2018 |
| EP | 3322247 A1 | 5/2018 |
| EP | 3836686 A1 | 6/2021 |
| WO | 2017133352 A1 | 8/2017 |

OTHER PUBLICATIONS

Ericsson, "Packet duplication for PC5," 3GPP TSG-RAN WG2 #100 Tdoc, R2-1713513, Reno, Nevada, USA, Nov. 27-Dec. 1, 2017, 5 pages.

Office Action issued in Chinese Application No. 201810968896.0 dated Jun. 25, 2021, 6 pages (with English translation).

Zte, "Discussion on sidelink resource request mechanism in PC5 CA," 3GPP TSG-RAN WG2 Meeting #100, R2-1713072, Reno, USA, Nov. 27-Dec. 1, 2017, 7 pages.

3GPP TS 23.285 V15.1.0 (Jun. 2018), "3rd Generation Partnership Project; Technical Specification Group Services and System Aspects; Architecture enhancements for V2X services (Release 15)," Jun. 2018, 36 pages.

Extended European Search Report issued in European Application No. 19851108.1 dated Sep. 24, 2021, 12 pages.

Huawei et al., "Summary of remaining issues on bandwidth part and wideband operation," 3GPP TSG RAN WG1 Meeting #92, R1-1801347, Athens, Greece, Feb. 26-Mar. 2, 2018, 13 pages.

ETSI MCC, "Report of 3GPP TSG RAN2#101 meeting, Athens, Greece," 3GPP TSG-RAN WG2 meeting #101, R2-1804201, Sanya, China, Apr. 16-20, 2018, 250 pages.

Huawei et al., "TS 36.300 Running CR for eV2X," 3GPP TSG-RAN WG2 Meeting #101bis, R2-1804642, Sanya, China, Apr. 16-20, 2018, 9 pages.

Zte, "Discussion on support of 64QAM over sidelink," 3GPP TSG-RAN WG2 Meeting #99, R2-1708512, Berlin, Germany, Aug. 21-25, 2017, 3 pages.

Office Action in Chinese Application No. 201810968896.0, dated Jul. 6, 2020, 18 pages.

PCT International Search Report and Written Opinion in International Application No. PCT/CN2019/101960, dated Nov. 22, 2019, 15 pages.

\* cited by examiner

V2X COMMUNICATION METHOD AND V2X COMMUNICATIONS APPARATUS

CROSS-REFERENCE TO RELATED APPLICATIONS

This application is a continuation of International Application No. PCT/CN2019/101960, filed on Aug. 22, 2019, which claims priority to Chinese Patent Application No. 201810968896.0, filed on Aug. 23, 2018. The disclosures of the aforementioned applications are hereby incorporated by reference in their entireties.

TECHNICAL FIELD

This application relates to the field of communications technologies, and in particular, to a V2X communication method and a V2X communications apparatus.

BACKGROUND

A vehicle to everything (V2X) technology implements communication between a vehicle and the outside. V2X services include a vehicle to infrastructure (V2I) service, a vehicle to network (V2N) service, a vehicle to pedestrian (V2P) service, and a vehicle to vehicle (V2V) service. For V2X that is based on long term evolution (LTE), there are two types of air interfaces: a Uu interface and a PC5 interface. The Uu interface is used for communication between a terminal device and a network device, the PC5 interface is used for sidelink communication between terminals, and both the Uu interface and the PC5 interface may be used to transmit V2X data.

The PC5 interface supports two resource allocation modes: a mode 3 and a mode 4. In the mode 3, a terminal device uses a dedicated resource for communication, where the dedicated resource can be used only by one terminal device; a network device allocates the dedicated resource to the terminal device by using a radio network temporary identifier (RNTI). In the mode 4, a competitive resource is used, where the competitive resource can be shared by a plurality of terminal devices; a network device may broadcast the competitive resource by using a system message.

With emergence of new services, new V2X services have higher delay and reliability requirements, and a current mechanism cannot effectively meet the service requirement.

SUMMARY

This application provides a V2X communication method and a V2X communications apparatus, so that transmission parameters can meet requirements of different services.

According to a first aspect of this application, a V2X communication method is provided. The method includes:

A terminal device obtains a first correspondence between service information and a first transmission parameter, where the service information includes any one or more of the following: a service identifier, a ProSe per-packet priority PPPP of a service, a ProSe per-packet reliability PPPR of a service, or a quality of service flow identifier QFI;
   the terminal device obtains a transmission resource and a second transmission parameter corresponding to the transmission resource, where the second transmission parameter has an association relationship with the first transmission parameter, or the second transmission parameter belongs to the first transmission parameter; and
   the terminal device allocates, based on the first correspondence and the second transmission parameter corresponding to the transmission resource, the transmission resource to a data packet corresponding to the service information.

In an example, the first transmission parameter includes any one or more of the following parameters: information about an allowed subcarrier spacing SCS, a maximum physical sidelink shared channel PSSCH duration, information about an allowed cell, information about an allowed frequency, information about a minimum block error rate, information about an allowed first-type resource, information about an allowed second-type resource, information about an allowed modulation and coding scheme MCS table, or information about an allowed air interface, where the first-type resource is a resource preconfigured by a network device, and the second-type resource is a semi-persistent scheduling resource or a dynamic scheduling resource.

In another example, the first correspondence is prestored in the terminal device; or
   the first correspondence is sent by the network device to the terminal device.

In another example, that the terminal device obtains a second transmission parameter corresponding to the transmission resource includes:
   The terminal device receives indication information that is of the second transmission parameter corresponding to the transmission resource and that is sent by the network device; or the terminal device receives indication information that is of association information of the second transmission parameter corresponding to the transmission resource and that is sent by the network device; and determines, based on the indication information of the association information of the second transmission parameter corresponding to the transmission resource, the second transmission parameter corresponding to the transmission resource.

In another example, that the terminal device obtains a second transmission parameter corresponding to the transmission resource includes:
   The terminal device determines, based on the service information of the to-be-transmitted data packet and the first correspondence, a transmission parameter meeting the service information of the to-be-transmitted data packet as the second transmission parameter corresponding to the transmission resource.

In another example, that the terminal device obtains a second transmission parameter corresponding to the transmission resource includes:
   When the terminal device is not in coverage of the network device, the terminal device determines a default transmission parameter as the second transmission parameter corresponding to the transmission resource.

In another example, that the terminal device obtains a transmission resource includes:
   The terminal device receives information that is about the transmission resource and that is sent by the network device, where
   the transmission resource is a dynamic scheduling resource, the information about the transmission resource is carried on a physical downlink control channel PDCCH, and the PDCCH further carries a bandwidth part BWP identifier; and the method further includes:
   When the terminal device receives the PDCCH, the terminal device switches, based on the BWP identifier, from a current BWP to a BWP corresponding to the BWP identifier, and starts or restarts a BWP activation timer, where the BWP activation timer is configured to control the terminal device to switch from the current BWP to a default BWP or an initial BWP after timeout, and the initial BWP is a BWP used by the terminal device to initially access a cell.

In another example, that the terminal device obtains a transmission resource includes:

The terminal device receives a second correspondence that is sent by the network device and that is between service information and a resource pool on a carrier/a third transmission parameter, where a plurality of resource pools on the carrier correspond to a plurality of zone identifiers, each zone is associated with a plurality of resource pools, the plurality of resource pools associated with each zone correspond to different transmission parameters, resource pools associated with a plurality of zones do not overlap, and the third transmission parameter is associated with the first transmission parameter, or the third transmission parameter belongs to the first transmission parameter;

- the terminal device determines a target zone based on a geographic position at which the terminal device is located;
- the terminal device determines a plurality of resource pools associated with the target zone;
- the terminal device determines, based on the service information of the to-be-transmitted data packet and the second correspondence, a resource pool that is in the plurality of resource pools associated with the target zone and that is used by the to-be-transmitted data packet; and
- the terminal device selects the transmission resource from the resource pool used by the to-be-transmitted data packet.

In another example, that the terminal device obtains a transmission resource includes:

The terminal device receives a third correspondence that is sent by the network device and that is between service information and a subchannel/a fourth transmission parameter, where a carrier includes a plurality of resource pools, each resource pool includes a plurality of subchannels, the plurality of subchannels included in each resource pool correspond to different transmission parameters, and the fourth transmission parameter is associated with the first transmission parameter, or the fourth transmission parameter belongs to the first transmission parameter,

- the terminal device determines, based on the service information of the to-be-transmitted data packet and the third correspondence, a subchannel set that is in subchannels included in the carrier and that is used by the to-be-transmitted data packet; and
- the terminal device selects the transmission resource from the subchannel set used by the to-be-transmitted data packet.

According to a second aspect of this application, a V2X communication method is provided. The method includes:

A network device sends a first correspondence between service information and a first transmission parameter to a terminal device, where the service information includes any one or more of the following information: a service identifier, a ProSe per-packet priority PPPP of a service, a ProSe per-packet reliability PPPR of a service, or a quality of service flow identifier QFI; and the first transmission parameter includes any one or more of the following parameters: information about an allowed subcarrier spacing SCS, a maximum physical sidelink shared channel PSSCH duration, information about an allowed cell, information about an allowed frequency, information about a minimum block error rate, information about an allowed first-type resource, information about an allowed second-type resource, information about an allowed modulation and coding scheme MCS table, or information about an allowed air interface, where the first-type resource is a resource preconfigured by the network device, and the second-type resource is a semi-persistent scheduling resource or a dynamic scheduling resource.

In an example, the method further includes:

The network device sends a PDCCH to the terminal device, where the PDCCH includes information about a transmission resource and a bandwidth part BWP identifier, and the BWP identifier is used to indicate the terminal device to switch to a BWP corresponding to the BWP identifier.

In an example, the method further includes:

The network device sends configuration information of a BWP activation timer to the terminal device, where the BWP activation timer is configured to control the terminal device to switch from a current BWP to a default BWP or an initial BWP after timeout, and the initial BWP is a BWP used by the terminal device for initial access.

In an example, the method further includes:

The network device sends a second correspondence between service information and a resource pool on a carrier/a third transmission parameter to the terminal device, where a plurality of resource pools on the carrier correspond to a plurality of zone identifiers, each zone is associated with a plurality of resource pools, the plurality of resource pools associated with each zone correspond to different transmission parameters, resource pools associated with a plurality of zones do not overlap, and the third transmission parameter is associated with the first transmission parameter, or the third transmission parameter belongs to the first transmission parameter.

In an example, the method further includes:

- the network device sends a third correspondence between service information and a subchannel/a fourth transmission parameter to the terminal device, where a carrier includes a plurality of resource pools, each resource pool includes a plurality of subchannels, the plurality of subchannels included in each resource pool correspond to different transmission parameters, and the fourth transmission parameter is associated with the first transmission parameter, or the fourth transmission parameter belongs to the first transmission parameter.

According to a third aspect of this application, a V2X communications apparatus is provided. The apparatus includes:

- a first obtaining module, configured to obtain a first correspondence between service information and a first transmission parameter, where the service information includes any one or more of the following information: a service identifier, a ProSe per-packet priority PPPP of a service, a ProSe per-packet reliability PPPR of a service, or a quality of service flow identifier QFI;
- a second obtaining module, configured to obtain a transmission resource and a second transmission parameter corresponding to the transmission resource, where the second transmission parameter has an association relationship with the first transmission parameter, or the second transmission parameter belongs to the first transmission parameter; and
- a resource allocation module, configured to allocate, based on the first correspondence and the second transmission parameter corresponding to the transmission resource, the transmission resource to a data packet corresponding to the service information.

In an example, the first transmission parameter includes any one or more of the following parameters: information about an allowed subcarrier spacing SCS, a maximum physical sidelink shared channel PSSCH duration, information about an allowed cell, information about an allowed frequency, information about a minimum block error rate, information about an allowed first-type resource, information about an allowed second-type resource, information about an allowed modulation and coding scheme MCS table, or information about an allowed air interface, where the first-type resource is a resource preconfigured by a network device, and the second-type resource is a semi-persistent scheduling resource or a dynamic scheduling resource.

In another example, the first correspondence is prestored in the terminal device; or
the first correspondence is sent by the network device to the terminal device.

In another example, the second obtaining module is specifically configured to:
receive indication information that is of the second transmission parameter corresponding to the transmission resource and that is sent by the network device; or
receive indication information that is of association information of the second transmission parameter corresponding to the transmission resource and that is sent by the network device; and determine, based on the indication information of the association information of the second transmission parameter corresponding to the transmission resource, the second transmission parameter corresponding to the transmission resource.

In another example, the second obtaining module is specifically configured to:
determine, based on the service information of the to-be-transmitted data packet and the first correspondence, a transmission parameter meeting the service information of the to-be-transmitted data packet as the second transmission parameter corresponding to the transmission resource.

In another example, the second obtaining module is specifically configured to:
when the terminal device is not in coverage of the network device, determine a default transmission parameter as the second transmission parameter corresponding to the transmission resource.

In another example, the second obtaining module is specifically configured to:
receive information that is about the transmission resource and that is sent by the network device, where
the transmission resource is a dynamic scheduling resource, the information about the transmission resource is carried on a physical downlink control channel PDCCH, and the PDCCH further carries a bandwidth part BWP identifier; and
the apparatus further includes:
a switching module, configured to: when the terminal device receives the PDCCH, switch, based on the BWP identifier, from a current BWP to a BWP corresponding to the BWP identifier; and
a timer control module, configured to start or restart a BWP activation timer, where the BWP activation timer is configured to control the terminal device to switch from the current BWP to a default BWP or an initial BWP after timeout, and the initial BWP is a BWP used by the terminal device to initially access a cell.

In another example, the second obtaining module is specifically configured to:
receive a second correspondence that is sent by the network device and that is between service information and a resource pool on a carrier/a third transmission parameter, where a plurality of resource pools on the carrier correspond to a plurality of zone identifiers, each zone is associated with a plurality of resource pools, the plurality of resource pools associated with each zone correspond to different transmission parameters, resource pools associated with a plurality of zones do not overlap, and the third transmission parameter is associated with the first transmission parameter, or the third transmission parameter belongs to the first transmission parameter;
determine a target zone based on a geographic position at which the apparatus is located;
determine a plurality of resource pools associated with the target zone;
determine, based on the service information of the to-be-transmitted data packet and the second correspondence, a resource pool that is in the plurality of resource pools associated with the target zone and that is used by the to-be-transmitted data packet; and
select the transmission resource from the resource pool used by the to-be-transmitted data packet.

In another example, the second obtaining module is specifically configured to:
receive a third correspondence that is sent by the network device and that is between service information and a subchannel/a fourth transmission parameter, where a carrier includes a plurality of resource pools, each resource pool includes a plurality of subchannels, the plurality of subchannels included in each resource pool correspond to different transmission parameters, and the fourth transmission parameter is associated with the first transmission parameter, or the fourth transmission parameter belongs to the first transmission parameter;
determine, based on the service information of the to-be-transmitted data packet and the third correspondence, a subchannel set that is in subchannels included in the carrier and that is used by the to-be-transmitted data packet; and
select the transmission resource from the subchannel set used by the to-be-transmitted data packet.

According to a fourth aspect of this application, a V2X communications apparatus is provided. The apparatus includes:
a sending module, configured to send a first correspondence between service information and a first transmission parameter to a terminal device, where the service information includes any one or more of the following information: a service identifier, a ProSe per-packet priority PPPP of a service, a ProSe per-packet reliability PPPR of a service, or a quality of service flow identifier QFI; and the first transmission parameter includes any one or more of the following parameters: information about an allowed subcarrier spacing SCS, a maximum physical sidelink shared channel PSSCH duration, information about an allowed cell, information about an allowed frequency, information about a minimum block error rate, information about an allowed first-type resource, information about an allowed second-type resource, information about an allowed modulation and coding scheme MCS table, or information about an allowed air interface, where the first-type resource is a resource preconfigured by the apparatus, and the second-type resource is a semi-persistent scheduling resource or a dynamic scheduling resource.

In an example, the sending module is further configured to:

send a physical downlink control channel PDCCH to the terminal device, where the PDCCH includes information about a transmission resource and a bandwidth part BWP identifier, and the BWP identifier is used to indicate the terminal device to switch to a BWP corresponding to the BWP identifier.

In another example, the sending module is further configured to:

send configuration information of a BWP activation timer to the terminal device, where the BWP activation timer is configured to control the terminal device to switch from a current BWP to a default BWP or an initial BWP after timeout, and the initial BWP is a BWP used by the terminal device for initial access.

In another example, the sending module is further configured to:

send a second correspondence between service information and a resource pool on a carrier/a third transmission parameter to the terminal device, where a plurality of resource pools on the carrier correspond to a plurality of zone identifiers, each zone is associated with a plurality of resource pools, the plurality of resource pools associated with each zone correspond to different transmission parameters, resource pools associated with a plurality of zones do not overlap, and the third transmission parameter is associated with the first transmission parameter, or the third transmission parameter belongs to the first transmission parameter.

In another example, the sending module is further configured to:

send a third correspondence between service information and a subchannel/a fourth transmission parameter to the terminal device, where a carrier includes a plurality of resource pools, each resource pool includes a plurality of subchannels, the plurality of subchannels included in each resource pool correspond to different transmission parameters, and the fourth transmission parameter is associated with the first transmission parameter, or the fourth transmission parameter belongs to the first transmission parameter.

According to a fifth aspect of this application, a terminal device is provided. The terminal device includes a processor, a memory, and a transceiver, where the memory is configured to store an instruction, the transceiver is configured to communicate with another device, and the processor is configured to execute the instruction stored in the memory, so that the terminal device performs the method according to the first aspect of this application.

According to a sixth aspect of this application, a network device is provided. The network device includes a processor, a memory, and a transceiver, where the memory is configured to store an instruction, the transceiver is configured to communicate with another device, and the processor is configured to execute the instruction stored in the memory, so that the network device performs the method according to the second aspect of this application.

According to a seventh aspect of this application, a computer-readable storage medium is provided. The computer-readable storage medium stores an instruction; and when the instruction is executed, a computer performs the method according to the first aspect of this application.

According to an eighth aspect of this application, a computer-readable storage medium is provided. The computer-readable storage medium stores an instruction; and when the instruction is executed, a computer performs the method according to the second aspect of this application.

According to a ninth aspect of this application, a system-on-a-chip is provided. The system-on-a-chip may be used in a terminal device, and the system-on-a-chip includes at least one communications interface, at least one processor, and at least one memory. The communications interface, the memory, and the processor are interconnected through a bus, and the processor executes an instruction stored in the memory, so that the terminal device can perform the method according to the first aspect of this application.

According to a tenth aspect of this application, a system-on-a-chip is provided. The system-on-a-chip may be used in a network device, and the system-on-a-chip includes at least one communications interface, at least one processor, and at least one memory. The communications interface, the memory, and the processor are interconnected through a bus, and the processor executes an instruction stored in the memory, so that the network device can perform the method according to the second aspect of this application.

According to an eleventh aspect of this application, a communications system is provided. The communications system includes a terminal device and a network device, where the terminal device is configured to perform the method according to the first aspect of this application, and the network device is configured to perform the method according to the second aspect of this application.

This application provides a V2X communication method and a V2X communications apparatus. The method includes: A terminal device obtains a first correspondence between service information and a first transmission parameter, where the service information includes any one or more of the following information: a service identifier, a PPPP of a service, a PPPR of a service, or a QFI of a service; and the first transmission parameter includes any one or more of the following parameters: information about an allowed SCS, a maximum PSSCH duration, information about an allowed cell, information about an allowed frequency, information about a minimum block error rate, information about an allowed first-type resource, information about an allowed second-type resource, information about an allowed MCS table, or information about an allowed air interface; obtains a transmission resource and a second transmission parameter corresponding to the transmission resource; and allocates, based on the first correspondence and the second transmission parameter corresponding to the transmission resource, the transmission resource to a data packet corresponding to the service information. According to the method, different transmission parameters can be selected for data packets corresponding to different services/PPPPs/PPPRs/QFIs based on service information of the data packets, so that the transmission parameters can meet service requirements.

DETAILED DESCRIPTION OF EMBODIMENTS

A network architecture and a service scenario described in embodiments of this application are intended to describe technical solutions in the embodiments of this application more clearly, but constitute no limitation on the technical solutions provided in the embodiments of this application. A person of ordinary skill in the art may learn that the technical solutions provided in the embodiments of this application are also applicable to a similar technical problem as the network architecture evolves and a new service scenario emerges.

Figure 1:
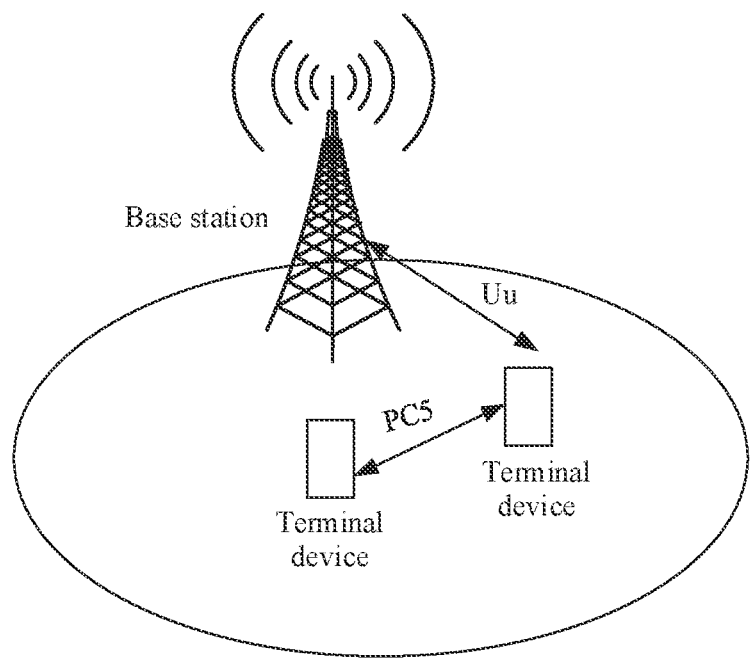
FIG. 1 is a schematic diagram of a network architecture to which this application is applicable.

FIG. 1 is a schematic diagram of a network architecture to which this application is applicable. As shown in FIG. 1, the network architecture includes a base station and two terminal devices. The base station communicates with the terminal device through a Uu interface, and the terminal devices communicate with each other through a PC5 interface, where both the Uu interface and the PC5 interface may be used for V2X communication. FIG. 1 is merely an example for description, and does not constitute a limitation. The network architecture may further include more base stations and terminal devices.

A terminal device in this application may also be referred to as a terminal, user equipment (UE), an access terminal, a subscriber unit, a subscriber station, a mobile station, a mobile console, a remote station, a remote terminal, a mobile device, a user terminal, a wireless communications device, a user agent, or a user apparatus. The terminal device may be a station (ST) in a wireless local area network (WLAN), may be a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, a wearable device, a terminal device in a next generation communications system, for example, a 5th generation (5G) communications network, a terminal device in a future evolved public land mobile network (PLMN), a terminal device in a new radio (NR) communications system, or the like.

A base station may be an access point (AP) in a WLAN, a base transceiver station (BTS) in a global system for mobile communications (GSM) system or a code division multiple access (CDMA) system, or a NodeB (NB) in a WCDMA system. Alternatively, the base station may be an evolved NodeB (eNB or eNodeB) in an LTE system, a relay station or an access point, a new generation NodeB (gNodeB) in an NR system, or the like. Optionally, the gNodeB may be in a form in which a central unit (CU) is separated from a distributed unit (DU).

The following describes some terms in this application, to facilitate understanding of a person skilled in the art.

(1) A unit in this application is a function unit or a logic unit. The unit may be in a form of software, and a processor executes program code to implement a function of the unit; or the unit may be in a form of hardware.

(2) "A plurality of" indicates two or more, and another quantifier is similar to this. The term "and/or" describes an association relationship between associated objects and represents that three relationships may exist. For example, A and/or B may represent the following three cases. Only A exists, both A and B exist, and only B exists. The character "/" generally represents an "or" relationship between associated objects. A range described by using "above", "below", or the like includes boundary points.

In the current technology, when terminal devices communicate with each other through a PC5 interface, a transmission parameter corresponding to a transmission resource used by the terminal devices is a fixed parameter, and the transmission parameter includes a numerology (a parameter set), a physical sidelink shared channel (PSSCH) duration, and the like, where the numerology is a parameter set including a subcarrier spacing (SCS) and a cyclic prefix (CP). Different V2X services have different delay and reliability requirements, and clearly, a fixed transmission parameter cannot be used to effectively meet the service requirements. To resolve a problem in the current technology, this application provides a V2X communication method. According to the method, different transmission parameters can be selected for different services or different data packets in a same service, thereby improving a delay and reliability of the service.

Figure 2:
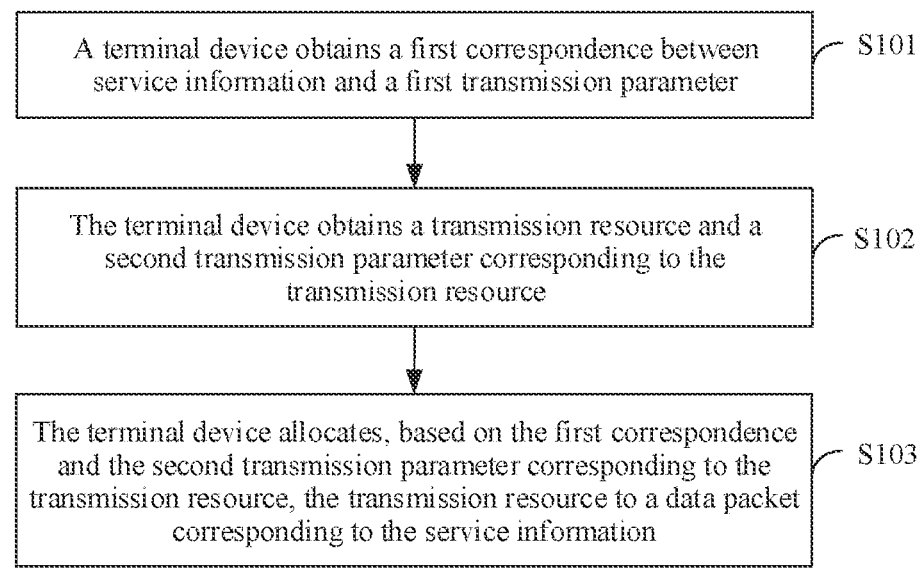
FIG. 2 is a flowchart of a V2X communication method according to an embodiment 1 of this application.

FIG. 2 is a flowchart of a V2X communication method according to an embodiment 1 of this application. As shown in FIG. 2, the method in this embodiment may include the following steps.

Step S101: A terminal device obtains a first correspondence between service information and a first transmission parameter.

The terminal device may obtain correspondences between one or more types of service information and a first transmission parameter. For example, the terminal device obtains a correspondence between service information 1 and a first transmission parameter and a correspondence between service information 2 and a first transmission parameter. Each type of service information includes any one or more of the following information: a service identifier, a ProSe per-packet priority (PPPP) of a service, a ProSe per-packet reliability (PPPR) of a service, or a quality of service flow identifier (QFI). The service identifier is used to uniquely identify a service. For example, the service identifier may be a destination identifier (destination ID). The PPPP, the PPPR, and the QFI are quantization parameters of quality of service (QoS) of a service. At least one PPPP, and/or at least one PPPR, and/or at least one QFI may be defined for each service. PPPPs, PPPRs, or QFIs of different services may be the same or may be different.

The QFI is used to identify a QoS flow. The QoS flow may be a fine-grained QoS differentiation mechanism. One QoS flow represents one type of flow having a same QoS parameter, and the QoS parameter includes any one or more of the following parameters:

1. Resource type: For example, the resource type may include any one or more of the following: a guaranteed bit rate (GBR), a non-guaranteed bit rate (non-GBR), or a delay critical guaranteed bit rate (GBR), where the GBR is used to indicate a guaranteed transmission resource of a QoS flow. The resource type is used to determine whether a value of a dedicated QoS flow-level guaranteed flow bit rate (GFBR) related to a network resource is permanently allocated.
2. Priority (priority level) information: For example, the priority information may be used to indicate scheduling priorities of different QoS flows, where a QoS flow with a higher priority is preferentially scheduled, and a priority associated with a 5G QoS feature is used to indicate a priority of a scheduling resource of a QoS flow.
3. Packet delay budget (PDB): For example, the PDB may define an upper limit of a delay of a data packet between a terminal device and a user plane function (UPF).
4. Packet error rate (PER): The PER may define an upper limit of a packet loss ratio of protocol data units (PDU) (for example, IP data packets), and the PDU may be a data packet that has been sent by a sender but has not been successfully received.
5. Averaging window: For example, the averaging window may be defined only for a GBR QoS flow, and the averaging window may represent a duration used for calculating a guaranteed flow bit rate (GFBR) or a duration used for calculating a maximum flow bit rate (MFBR).
6. Maximum data burst volume (MDBV): For example, the MDBV may be used only for a delay critical GBR resource type, and the MDBV may represent a maximum data volume that needs to be served by a 5G access network (5G-AN) in a 5G-AN PDB (for example, a 5G-AN partial PDB).

For example, the first transmission parameter includes any one or more of the following parameters:

a. Information about an allowed SCS: For example, the information about the allowed SCS may exist in a form of a list (allowedSCS-list). There may be one or more allowed SCSs of sidelink data corresponding to service information. For example, sidelink data corresponding to a PPPR 1 is allowed to be transmitted on a resource with an SCS of 15 kHz, and sidelink data corresponding to a PPPR 2 is allowed to be transmitted on resources with SCSs of 15 kHz and 120 kHz. For sidelink data corresponding to a PPPR, if an SCS is larger, a reliability of the sidelink data is higher, and this facilitates Doppler shift resistance. It should be noted that the sidelink data in this embodiment of this application is data transmitted through a sidelink, and may be V2X data.

b. Maximum PSSCH duration (max-PSSCHduration): For example, a duration of a PSSCH may be a duration of a time domain resource occupied by a medium access control protocol data unit (MAC PDU). When a terminal device transmits sidelink data (for example, a sidelink MAC PDU) through a PSSCH, a duration of the used PSSCH cannot be greater than the maximum PSSCH duration. For a service with a lower delay, a duration of a PSSCH should be as short as possible. For example, a maximum PSSCH duration corresponding to the service information 1 is T1, and a maximum PSSCH duration corresponding to the service information 2 is T2, where T1 is greater than T2; or a maximum PSSCH duration corresponding to a PPPP 1 is T3, and a maximum PSSCH duration corresponding to a PPPP 2 is T4, where T3 is greater than T4.

c. Information about an allowed cell: For example, the information about the allowed cell includes identification information of the cell, for example, an index of the cell. A factor such as load or interference of the cell affects a QoS requirement of a service. Therefore, the transmission parameter may include the information about the allowed cell. Sidelink data corresponding to service information may be allowed to be transmitted in one or more cells. Allowed cells of data corresponding to different service information may be the same or may be different. For example, an allowed cell of data corresponding to the service information 1 is a cell 1, allowed cells of data corresponding to the service information 2 are the cell 1 and a cell 2, and an allowed cell of data corresponding to service information 3 is the cell 2.

d. Information about an allowed frequency: For example, the allowed frequency may be a center frequency of a frequency band, and the information about the allowed frequency may include identification information of the frequency, and optionally, may further include a frequency value of the frequency or a frequency band range of the frequency. A plurality of cells may be deployed on one center frequency. A higher frequency indicates faster channel fading and a lower reliability. For a service with a high reliability requirement, a frequency band with a relatively low frequency is selected as much as possible. Data corresponding to service information may have one or more allowed frequencies. For example, an allowed frequency of data corresponding to the service information 1 is f1, allowed frequencies of data corresponding to the service information 2 are f1 and f2, and an allowed frequency of data corresponding to service information 3 is f3.

e. Information about a minimum block error rate (BER): For example, the BER is a percentage of error PDUs to all transmitted PDUs, and the block error rate is an average value during long-term statistics collection and an important indicator that reflects quality of service of network performance. If a block error rate of a transmission resource is greater than or equal to the minimum block error rate, the transmission resource is allocated to a data packet corresponding to service information. If a block error rate of a transmission resource is less than the minimum block error rate, it indicates that the transmission resource does not meet a requirement, and the transmission resource is not allocated to a data packet corresponding to service information. Data corresponding to different service information has different minimum block error rates. For example, a minimum block error rate of data corresponding to the service information 1 is 99%, and a minimum block error rate of data corresponding to the service information 2 is 99.999%.

f. Information about an allowed first-type resource: For example, the first-type resource is a resource preconfigured by a network device, and the network device may configure the first-type resource by using a radio resource control (RRC) message. The first-type resource is used for sidelink transmission, data transmission is performed in a mode 4 in V2X that is based on LTE by using the first-type resource, and the information about the first-type resource includes a time domain position and a frequency domain position of the first-type resource. Optionally, the first-type resource may be shared by a plurality of users, the network device may broadcast the information about the first-type resource by using system information, and all terminal devices in a cell can receive the information about the first-type resource. For a service with a relatively high reliability requirement, sidelink transmission is not suitable to be performed on the first-type resource. In this embodiment of this application, allowed first-type resources of data corresponding to different service information may be the same or may be different. For example, a reliability of a PPPR 1 is higher than a reliability of a PPPR 2. In this case, data corresponding to the PPPR 1 is not allowed to use the first-type resource, and data corresponding to the PPPR 2 is allowed to use the first-type resource.

g. Information about an allowed second-type resource: For example, the second-type resource is a semi-persistent scheduling (SPS) resource or a dynamic scheduling resource. The SPS resource is a resource allocated by the network device by using an RRC message and downlink control information (DCI), and the dynamic scheduling resource is a resource allocated by the network device by using DCI. The second-type resource is used for sidelink transmission, and data transmission is performed in a mode 3 V2X that is based on LTE by using the second-type resource. When the SPS resource is configured, the RRC message indicates a time domain resource position, for example, a periodicity and a start time domain position, and the DCI indicates a frequency domain resource position. In this embodiment of this application, allowed second-type resources of data corresponding to different service information may be the same or may be different. For example, data corresponding to a PPPP 1 is allowed to use a first resource, and data corresponding to a PPPP 2 is allowed to use a second resource, where both the first resource and the second resource are second-type resources.

The second-type resource is classified into two types: a type 1 and a type 2. For example, a second-type resource of the type 1 means that the second-type resource is both a second-type resource and a first-type resource, and a second-type resource of the type 2 means that the second-type resource is only a second-type resource rather than a first-type resource. When the second-type resource is a resource corresponding to the type 1, the information about the allowed second-type resource is indication information used to indicate that the resource corresponding to the type 1 is allowed to be used. When the second-type resource is a resource corresponding to the type 2, the information about the allowed second-type resource is indication information used to indicate that the resource corresponding to the type 2 is allowed to be used. When the second-type resource includes a resource corresponding to the type 1 and a resource corresponding to the type 2, the information about the allowed second-type resource includes indication information used to indicate that the resource corresponding to the type 1 is allowed to be used and/or indication information used to indicate that the resource corresponding to the type 2 is allowed to be used.

h. Information about an allowed modulation and coding scheme (MCS) table: Different service information corresponds to different block error rates. For example, for a service with a relatively high reliability requirement, a robust MCS table is required for sidelink data transmission. The information about the MCS table may be identification information of the MCS table, for example, an index of the MCS table. The network device may preconfigure, in the terminal device, a correspondence between an MCS table and a parameter that affects a transmission rate. An MCS table includes at least one MCS index, each MCS index corresponds to a group of parameters that affect a transmission rate, and the parameters that affect the transmission rate may be a modulation order and a transport block size (TBS). The following Table 1 is a schematic diagram of an MCS table. In Table 1, the first column is an MCS index, the second column is a modulation order, and the third column is a TBS index.

TABLE 1

| MCS index | Modulation order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Optionally, the network device may configure at least one MCS table for the terminal device by using an RRC message, or prestore at least one MCS table in the terminal device according to a protocol. When allocating a sidelink resource, the network device indicates an MCS table, in the at least one MCS table, used by the allocated sidelink resource.

i. Information about an allowed air interface: Service data transmitted through different air interfaces is different, the different air interfaces may be air interfaces with different content of any one or more of the following parameters or information, and the following parameters or information may be configured by the network device for the terminal device by using an RRC message, or may be prestored in the terminal device according to a protocol specification.

A. Waveform Parameter

The waveform parameter is a parameter that can indicate or determine a waveform. By way of example rather than limitation, in this embodiment of this application, the waveform parameter may include any one or more of the following parameters:

A1. a waveform parameter used in an orthogonal frequency division multiplexing (OFDM) technology;

A2. a waveform parameter used in a single-carrier frequency-division multiple access (SC-OFDM) technology;

A3. a waveform parameter used in a filter orthogonal frequency division multiplexing (filter OFDM) technology;

A4. a waveform parameter used in a universal filtered multi-carrier (UFMC) technology;

A5. a waveform parameter used in a filter bank multi-carier (FBMC) technology; or A6. a waveform parameter used in a generalized frequency division multiplexing (GFDM) technology.

B. Modulation Scheme

In a communications technology, to ensure a communication effect and resolve a problem in long-distance signal transmission, a signal spectrum needs to be shifted, through modulation, to a high frequency channel for transmission. By way of example rather than limitation, in this embodiment of this application, the modulation scheme may include any one or more of the following schemes:

B1. amplitude shift keying (ASK) modulation;
B2. phase shift keying (PSK) modulation;
B3. frequency shift keying (FSK) modulation;
B4. quadrature amplitude modulation (QAM);
B5. minimum shift keying (MSK) modulation;
B6. Gaussian filtered minimum shift keying (GMSK) modulation; or
B7. OFDM modulation.

C. Bandwidth Configuration

In this embodiment of this application, the bandwidth configuration may be a width of a frequency domain resource required by an air interface. By way of example rather than limitation, a bandwidth configuration corresponding to a broadband transmission service may be a minimum width of a frequency domain resource required by an air interface or a minimum quantity of subcarriers required by an air interface; a bandwidth configuration corresponding to a narrowband transmission service may be a maximum width of a frequency domain resource required by an air interface, or a maximum quantity of subcarriers required by an air interface.

D. Radio Frame Configuration Mode

In this embodiment of this application, a radio frame configuration parameter includes any one or more of the following parameters:

D1. a subcarrier spacing:
D2. a symbol length:
D3. a cyclic prefix;
D4. a duplex mode, where, for example, the duplex mode may be a full-duplex mode, a half-duplex mode (including a half-duplex uplink-downlink configuration), or a flexible duplex mode; and for example, in some air interfaces, the duplex mode may be fixed or flexible, and this is not particularly limited in this application:
D5. a transmission time interval (TTI) length, where, for example, in some air interfaces, a transmission time interval may be a fixed value or may be flexible, and this is not particularly limited in this application; or
D6. a radio frame length and a radio subframe length.

E. Resource Multiplexing Mode

By way of example rather than limitation, in this embodiment of this application, the resource multiplexing mode may include any one or more of the following modes:

E1. Frequency division multiplexing (FDM): For example, a total bandwidth used to transmit a channel is divided into several subbands (or referred to as subchannels), and each subchannel transmits one signal. In the frequency division multiplexing, a total frequency width is required to be greater than a sum of frequencies of the subchannels; to ensure that signals transmitted on the subchannels do not interfere with each other, a guard band should be set between the subchannels. In this way, it is ensured that the signals do not interfere with each other.

E2. Time division multiplexing (TDM): For example, different signals are transmitted in different time periods of a same physical connection, so that multi-path transmission can also be implemented. In the time division multiplexing, a time is used as a parameter for signal division, so that it is required that signals do not overlap with each other along a time axis. The time division multiplexing is to divide a time provided for transmission on an entire channel into several time slices (referred to as slots for short), and allocate the slots to signal sources for use.

E3. Space division multiplexing (SDM): For example, a same frequency band is repeatedly used in different spaces. In mobile communication, a basic technology for implementing space division is to form different beams in different user directions by using an adaptive array antenna. In addition, different users may be distinguished through space division, each beam may provide a unique channel that is not interfered with by another user, different data of a same user may be distinguished through space division, or same data of a same user may be distinguished through space division, to obtain a higher gain.

E4. Code division multiplexing (CDM): For example, the code division multiplexing is a multiplexing mode in which original signals are distinguished by using different codes. By way of example rather than limitation, the code division multiplexing may be CDMA, frequency division multiple access (FDMA), time division multiple access (TDMA), and synchronous code division multiple access (SCDMA).

G. Channel Configuration Mode

In this embodiment of this application, different types of data or signals may be transmitted on different channels. Therefore, the channel configuration mode may refer to a time-frequency resource, a code domain resource, or a space domain resource (such as a specified beam) corresponding to a channel.

By way of example rather than limitation, in this embodiment of this application, a channel used for wireless communication may include at least one of the following channels or a combination of a plurality of the following channels:

G1. a control channel, where the control channel is used to transmit control information, and for example, the control channel may include an uplink control channel and a downlink control channel:
G2. a data channel, where the data channel is used to transmit data, and for example, the data channel may include an uplink data channel and a downlink data channel:
G3. a reference channel, where the reference channel is used to transmit a reference signal; and
G4. an access channel, where the access channel is used to send access information.

H. Coding Scheme

Coding is a transformation performed on a source symbol to improve communication effectiveness, or is a transformation performed on a source symbol to reduce or eliminate source redundancy. For example, a source output symbol sequence is transformed into a shortest codeword sequence, so that an average information amount loaded by elements of the shortest codeword sequence is the largest, and it can be ensured that the original symbol sequence can be restored without distortion.

By way of example rather than limitation, in this embodiment of this application, the following coding schemes may be illustrated:

H1. a polar code coding scheme:
H2. a turbo code coding scheme;
H3. a convolution code) coding scheme; and
H4. a low density parity check code coding scheme.

I. Protocol Stack Configuration Mode

A protocol stack is a sum of all protocol layers in a network. The protocol stack vividly reflects a file transmission process in a network: from an upper layer protocol to a bottom layer protocol, and then from the bottom layer protocol to the upper layer protocol. By way of example rather than limitation, in this embodiment of this application, a protocol stack used in wireless communication may include at least one of the following protocol layers or a combination of a plurality of the following protocol layers, where each protocol layer may have a plurality of protocol entities:

I1. a packet data convergence protocol (PDCP) layer;
I2. a radio link control (RLC) layer;
I3. a MAC layer;
I4. a physical layer; and
I5. an RRC layer.

J. Multiple Access Mode

Different from multiplexing, in a multiple access technology, various pieces of information do not need to be centralized but are respectively modulated to channels, and required information obtained through modulation is respectively obtained from the channels. By way of example rather than limitation, in this embodiment of this application, a multiple access mode used in wireless communication may include any one or more of the following:

J1. FDMA;
J2. TDMA;
J3. CDMA:
J4. SCMA;
J5. non-orthogonal multiple access (NOMA); or
J6. multi-user shared access (MUSA).

Service data transmitted through different air interfaces is different. For example, data corresponding to the service information 1 is transmitted through an LTE air interface, data corresponding to the service information 2 is transmitted through an NR air interface, and data corresponding to service information 3 is transmitted through an LTE air interface and an NR air interface.

For example, the first correspondence is prestored in the terminal device, or the first correspondence may be specified in the protocol. Alternatively, the first correspondence is sent by the network device to the terminal device. In other words, the first correspondence is configured by the network device, and the network device may broadcast the first correspondence to the terminal device by using a system message, or send the first correspondence to the terminal device by using dedicated signaling.

Step S102: The terminal device obtains a transmission resource and a second transmission parameter corresponding to the transmission resource.

The transmission resource is a resource, for example, a sidelink resource, used for V2X communication, and the second transmission parameter has an association relationship with the first transmission parameter, or the second transmission parameter belongs to the first transmission parameter.

For example, if the first transmission parameter is the information about the allowed SCS, the second transmission parameter is information about an SCS of the transmission resource, or the second transmission parameter is one or more parameters associated with an SCS of the transmission resource. The terminal device may determine the SCS of the transmission resource based on the parameter associated with the SCS of the transmission resource. For example, if allowed SCSs in the first transmission parameter corresponding to the service information are 15 kHz, 20 kHz, and 30 kHz, the second transmission parameter may be any one of 15 kHz, 20 kHz, and 30 kHz.

For example, if the first transmission parameter is the maximum PSSCH duration, the second transmission parameter is a PSSCH duration of the transmission resource, and the PSSCH duration of the transmission resource is less than or equal to the maximum PSSCH duration; or the second transmission parameter is one or more parameters associated with a PSSCH duration of the transmission resource, and the PSSCH duration of the transmission resource may be determined based on the parameter associated with the PSSCH duration of the transmission resource, where the associated parameter may be a sidelink grant. It is assumed that the maximum PSSCH duration corresponding to the service information is T1 milliseconds (ms). In this case, a value of the PSSCH duration T2 milliseconds ms of the transmission resource is less than or equal to T1.

For example, if the first transmission parameter is the information about the allowed cell, the second transmission parameter is information about a cell to which the transmission resource belongs, where the cell to which the transmission resource belongs is a subset of the allowed cell in the first transmission parameter; or the second transmission parameter is one or more parameters associated with information about a cell to which the transmission resource belongs, and the cell to which the transmission resource belongs may be determined based on the parameter associated with the information about the cell to which the transmission resource belongs. It is assumed that allowed cells in the first transmission parameter corresponding to the service information are a cell 1 and a cell 2. In this case, the second transmission parameter may be identification information of the cell 1 or identification information of the cell 2, where the identification information of the cell may be a cell index.

For example, if the first transmission parameter is the information about the allowed frequency, the second transmission parameter is information about a frequency of the transmission resource, and the frequency that is of the transmission resource and that is included in the second transmission parameter is a subset of the allowed frequency in the first transmission parameter; or the second transmission parameter is one or more parameters associated with a frequency of the transmission resource, and the frequency of the transmission resource may be determined based on the parameter associated with the frequency of the transmission resource. It is assumed that allowed frequencies in the first transmission parameter corresponding to the service information are f1 and f2. In this case, the second transmission parameter may be identification information of f1 or identification information of f2.

For example, if the first transmission parameter is the information about the minimum block error rate, the second transmission parameter is information about a block error rate of the transmission resource, and the block error rate of the transmission resource is less than or equal to the minimum block error rate; or the second transmission parameter is one or more parameters associated with a block error rate of the transmission resource, and the block error rate of the transmission resource may be determined based on the parameter associated with the block error rate of the transmission resource. It is assumed that the minimum block error rate corresponding to the service information is 5%. In this case, the block error rate that is of the transmission resource and that is included in the second transmission parameter is 4.5%, 4%, or the like.

For example, if the first transmission parameter is the information about the allowed first-type resource, the second transmission parameter is information about a first-type resource used by the transmission resource, and the first-type resource used by the transmission resource is a subset of the allowed first-type resource in the first transmission parameter.

For example, if the first transmission parameter is the information about the allowed second-type resource, the second transmission parameter is information about a second-type resource used by the transmission resource, and the second-type resource used by the transmission resource is a subset of the allowed second-type resource in the first transmission parameter. When the second-type resource is a resource corresponding to the type 1, the second-type resource used by the transmission resource is the resource corresponding to the type 1. When the second-type resource is a resource corresponding to the type 2, the second-type resource used by the transmission resource is the resource corresponding to the type 2. When the second-type resource includes a resource corresponding to the type 1 and a resource corresponding to the type 2, the second-type resource used by the transmission resource is the resource corresponding to the type 1 and/or the resource corresponding to the type 2.

For example, if the first transmission parameter is the information about the allowed MCS table, the second transmission parameter is information about an MCS table used by the transmission resource, and the MCS table used by the transmission resource is a subset of the allowed MCS table in the first transmission parameter, or the second transmission parameter is one or more parameters associated with an MCS table used by the transmission resource, and the MCS table used by the transmission resource may be determined based on the parameter associated with the MCS table used by the transmission resource. It is assumed that allowed MCS tables in the first transmission parameter corresponding to the service information are an MCS table 1 and an MCS table 2. In this case, the second transmission parameter includes any one or more of an identifier of the MCS table 1 or an identifier of the MCS table 2.

For example, if the first transmission parameter is the information about the allowed air interface, the second transmission parameter is information about an air interface used by the transmission resource, and the air interface used by the transmission resource is a subset of the allowed air interface in the first transmission parameter; or the second transmission parameter is one or more parameters associated with an air interface used by the transmission resource, and the air interface used by the transmission resource may be determined based on the parameter associated with the air interface used by the transmission resource. It is assumed that the allowed air interface in the first transmission parameter corresponding to the service information includes an air interface 1, an air interface 2, and an air interface 3. In this case, the second transmission parameter includes any one or more of an identifier of the air interface 1, an identifier of the air interface 2, or an identifier of the air interface 3.

The foregoing uses examples in which the first transmission parameter includes a single parameter for description. Certainly, the first transmission parameter may further include a plurality of parameters. In this case, the second transmission parameter also includes a plurality of parameters, where types of parameters included in the second transmission parameter are the same as types of parameters included in the first transmission parameter, values of parameters that are of a same type and that are respectively in the second transmission parameter and the first transmission parameter are the same, or a value of a parameter in the second transmission parameter is a subset of a value of a parameter in the first transmission parameter.

The transmission resource may be a first-type resource or a second-type resource, and the second-type resource includes a dynamic scheduling resource or an SPS resource. When the transmission resource is the dynamic scheduling resource in the second-type resource, the network device may allocate, by using a physical downlink control channel (PDCCH), the transmission resource used in current transmission. When the transmission resource is the SPS resource in the second-type resource, the network device may indicate a time domain resource position by using an RRC message, and indicate a frequency domain resource position by using DCI. When the transmission resource is the first-type resource, the network device may carry information about the first-type resource in an RRC message or a system message.

For example, unless otherwise specified, the transmission resource mentioned in the embodiments of this application is a resource used for sidelink transmission rather than a resource used for Uu interface transmission. To distinguish between a dynamic scheduling resource used for the sidelink transmission and a dynamic scheduling resource used for the Uu interface transmission, PDCCHs may be scrambled by using different scrambling codes. For example, a PDCCH used to allocate the dynamic scheduling resource for the sidelink transmission is scrambled by using a V2X-C-RNTI, and a PDCCH used to allocate the dynamic scheduling resource for the Uu interface transmission is scrambled by using a C-RNTI. Similarly, to distinguish between an SPS resource used for the sidelink transmission and an SPS resource used for the Uu interface transmission, PDCCHs may also be scrambled by using different scrambling codes. For example, a PDCCH used to allocate the SPS resource for the sidelink transmission is scrambled by using a V2X-CS-RNTI, and a PDCCH used to allocate the SPS resource for the Uu interface transmission is scrambled by using a CS-RNTI.

For example, the terminal device may obtain the second transmission parameter corresponding to the transmission resource in the following several manners:

Manner (1): The terminal device receives indication information that is of the second transmission parameter corresponding to the transmission resource and that is sent by the network device; or the terminal device receives indication information that is of association information of the second transmission parameter corresponding to the transmission resource and that is sent by the network device, and determines the second transmission parameter corresponding to the transmission resource based on the indication information of the association information of the second transmission parameter corresponding to the transmission resource.

For example, the network device directly indicates the second transmission parameter in an indication (DCI or RRC) used to allocate the sidelink transmission resource. Alternatively, the terminal device determines the second transmission parameter of the sidelink transmission resource by using a transmission parameter used to receive the DCI. For example, if the DCI is used to allocate a mode 3 sidelink grant, and a transmission parameter used to receive the DCI is an SCS, the terminal device determines an SCS corresponding to the sidelink grant by using the SCS used to receive the DCI.

Manner (2): The terminal device determines, based on the service information of a to-be-transmitted data packet and the first correspondence, a transmission parameter meeting the service information of the to-be-transmitted data packet as the second transmission parameter corresponding to the transmission resource.

For example, the terminal device determines, in the to-be-transmitted data packet, a data packet with a highest priority based on the service information of the currently arrived to-be-transmitted data packet. The data packet with the highest priority is any one of the following data packets: a data packet corresponding to a PPPP with a highest priority, a data packet corresponding to a PPPR with a highest reliability requirement, a data packet corresponding to a service identifier with a highest priority, or a data packet corresponding to a QFI with a highest priority. Then, a first transmission parameter corresponding to service information of the data packet with the highest priority is determined based on the service information of the data packet with the highest priority and the first correspondence between service information and a first transmission parameter, and the second transmission parameter corresponding to the transmission resource is determined in the first transmission parameter corresponding to the service information of the data packet with the highest priority.

In this embodiment, the second transmission parameter corresponding to the transmission resource includes any one or more of the following parameters: information about an SCS of the transmission resource, a PSSCH duration of the transmission resource, information about a cell to which the transmission resource belongs, information about a frequency of the transmission resource, information about a block error rate of the transmission resource, information about a first-type resource used by the transmission resource, information about a second-type resource used by the transmission resource, information about an MCS table used by the transmission resource, or information about an air interface used by the transmission resource. A part of or all parameters in the second transmission parameter may be determined in the following manners.

a. It is assumed that the first transmission parameter corresponding to the service information of the data packet with the highest priority includes an allowed cell/frequency. In this case, a cell/frequency that meets a QoS requirement is determined, in the allowed cell/frequency, as the cell/frequency of the transmission resource, where the service information of the data packet with the highest priority is any one of the following information: the PPPP with the highest priority, the PPPR with the highest reliability requirement, the service identifier with the highest priority, or the QFI with the highest priority.

b. It is assumed that the first transmission parameter corresponding to the service information of the data packet with the highest priority includes an allowed SCS. In this case, an SCS that meets a QoS requirement is determined, in the allowed SCS, as the SCS of the transmission resource, where the service information of the data packet with the highest priority is any one of the following information: the PPPP with the highest priority, the PPPR with the highest reliability requirement, the service identifier with the highest priority, or the QFI with the highest priority.

c. It is assumed that the first transmission parameter corresponding to the service information of the data packet with the highest priority includes an allowed MCS table. In this case, an MCS table that meets a QoS requirement is determined, in the allowed MCS table, as the MCS table used by the transmission resource, where the service information of the data packet with the highest priority is any one of the following information: the PPPP with the highest priority, the PPPR with the highest reliability requirement, the service identifier with the highest priority, or the QFI with the highest priority.

d. It is assumed that the first transmission parameter corresponding to the service information of the data packet with the highest priority includes a maximum PSSCH duration. In this case, a PSSCH duration that meets a QoS requirement is determined, based on the maximum PSSCH duration, as the PSSCH duration of the transmission resource, where the service information of the data packet with the highest priority is any one of the following information: the PPPP with the highest priority, the PPPR with the highest reliability requirement, the service identifier with the highest priority, or the QFI with the highest priority.

e. It is assumed that the first transmission parameter corresponding to the service information of the data packet with the highest priority includes a minimum block error rate. In this case, a block error rate that meets a QoS requirement is determined as the block error rate used by the transmission resource, where the service information of the data packet with the highest priority is any one of the following information: the PPPP with the highest priority, the PPPR with the highest reliability requirement, the service identifier with the highest priority, or the QFI with the highest priority.

f. It is assumed that the first transmission parameter corresponding to the service information of the data packet with the highest priority includes information about an air interface. In this case, an air interface that meets a QoS requirement is determined as the air interface used by the transmission resource, where the service information of the data packet with the highest priority is any one of the following information: the PPPP with the highest priority, the PPPR with the highest reliability requirement, the service identifier with the highest priority, or the QFI with the highest priority.

The manner (1) and the manner (2) are applicable to a scenario in which the terminal device is in coverage of the network device, where when the terminal device is in the coverage of the network device, the terminal device may receive a cellular network signal sent by the network device.

(3) When the terminal device is out of the coverage of the network device, the terminal device determines a preconfigured transmission parameter as the second transmission parameter corresponding to the transmission resource. The preconfigured transmission parameter may be specified in the protocol and prestored in the terminal device, or may be allocated and sent by a control node in the sidelink transmission to the terminal device. That the terminal device is out of the coverage of the network device means that the terminal device cannot receive a cellular network signal.

Step S103: The terminal device allocates, based on the first correspondence and the second transmission parameter corresponding to the transmission resource, the transmission resource to the data packet corresponding to the service information.

For example, the data packet corresponding to the service information is at least one data packet that currently arrives at a sidelink protocol stack. Service information of the at least one currently arrived data packet may be first determined, for example, a PPPP, a PPPR, a service identifier, or a QFI corresponding to the at least one currently arrived data packet is determined; then, a first transmission parameter corresponding to the at least one currently arrived data packet is determined based on the service information of the at least one currently arrived data packet and the first correspondence; and a data packet that can be transmitted on the transmission resource is determined based on the first transmission parameter corresponding to the at least one currently arrived data packet and the second transmission parameter corresponding to the transmission resource, where the first transmission parameter of the data packet that can be transmitted on the transmission resource meets the second transmission parameter corresponding to the transmission resource.

For example, the second transmission parameter corresponding to the transmission resource is the SCS of the transmission resource. It is assumed that the SCS of the transmission resource is an SCS 1, and the at least one currently arrived data packet includes a data packet corresponding to the service information 1 and a data packet corresponding to the service information 2. In this case, it can be learned from the first correspondence that allowed SCSs of the service information 1 are the SCS 1 and an SCS 2, and an allowed SCS of the service information 2 is the SCS 2; and only the data packet corresponding to the SCS 1 can be transmitted on the transmission resource, so that the transmission resource is allocated to the data packet corresponding to the service information 1.

For example, the second transmission parameter corresponding to the transmission resource is the PSSCH duration of the transmission resource. It is assumed that the PSSCH duration of the transmission resource is T1, and the at least one currently arrived data packet includes a data packet corresponding to the service information 1 and a data packet corresponding to the service information 2. In this case, it can be learned from the first correspondence that a maximum PSSCH duration corresponding to the service information 1 is T2, and a maximum PSSCH duration corresponding to the service information 2 is T3, where T1 is less than T2, and T1 is greater than T3. Therefore, only the data packet corresponding to the service information 1 can be transmitted on the transmission resource, so that the transmission resource is allocated to the data packet corresponding to the service information 1.

For example, the second transmission parameter corresponding to the transmission resource is the information about the cell to which the transmission resource belongs. It is assumed that the information about the cell to which the transmission resource belongs is an identifier of a cell 1, and the at least one currently arrived data packet includes a data packet corresponding to the service information 1 and a data packet corresponding to the service information 2. In this case, it can be learned from the first correspondence that allowed cells corresponding to the service information 1 are the cell 1 and a cell 2, and allowed cells corresponding to the service information 2 are the cell 1 and a cell 3. Therefore, the data packet corresponding to the service information 1 and the data packet corresponding to the service information 2 each can be transmitted on the transmission resource, so that the transmission resource is allocated to the data packet corresponding to the service information 1 and/or the data packet corresponding to the service information 2, where a quantity of resources allocated to each of the data packet corresponding to the service information 1 and the data packet corresponding to the service information 2 is not limited.

For example, the second transmission parameter corresponding to the transmission resource is the information about the frequency of the transmission resource. It is assumed that the information about the frequency of the transmission resource is an identifier of f1, and the at least one currently arrived data packet includes a data packet corresponding to the service information 1 and a data packet corresponding to the service information 2. In this case, it can be learned from the first correspondence that an allowed frequency corresponding to the service information 1 is f2, and allowed frequencies corresponding to the service information 2 are f1 and f2. Therefore, only the data packet corresponding to the service information 2 can be transmitted on the transmission resource, so that the transmission resource is allocated to the data packet corresponding to the service information 2.

For example, the second transmission parameter corresponding to the transmission resource is the information about the block error rate of the transmission resource. It is assumed that the block error rate of the transmission resource is 3%, and the at least one currently arrived data packet includes a data packet corresponding to the service information 1 and a data packet corresponding to the service information 2. In this case, it can be learned from the first correspondence that a minimum block error rate corresponding to the service information 1 is 5%, and a minimum block error rate corresponding to the service information 2 is 4%. Therefore, the data packet corresponding to the service information 1 and the data packet corresponding to the service information 2 each can be transmitted on the transmission resource, so that the transmission resource is allocated to the data packet corresponding to the service information 1 and/or the data packet corresponding to the service information 2, where a quantity of resources allocated to each of the data packet corresponding to the service information 1 and the data packet corresponding to the service information 2 is not limited.

For example, the second transmission parameter corresponding to the transmission resource is the information about the first-type resource used by the transmission resource. It is assumed that the first-type resource used by the transmission resource is a first resource, and the at least one currently arrived data packet includes a data packet corresponding to the service information 1 and a data packet corresponding to the service information 2. In this case, it can be learned from the first correspondence that a first-type resource corresponding to the service information 1 belongs to the first resource, and a first-type resource corresponding to the service information 2 does not belong to the first resource. Therefore, the data packet corresponding to the service information 1 can be transmitted on the transmission resource, so that the transmission resource is allocated to the data packet corresponding to the service information 1.

When the second transmission parameter corresponding to the transmission resource is the information about the second-type resource used by the transmission resource, a manner of allocating the transmission resource is similar to the manner of allocating the transmission resource when the second transmission parameter corresponding to the transmission resource is the information about the first-type resource. Details are not repeatedly described herein again.

For example, the second transmission parameter corresponding to the transmission resource is the information about the MCS table used by the transmission resource. It is assumed that the MCS table used by the transmission resource is an MCS table 2, and the at least one currently arrived data packet includes a data packet corresponding to the service information 1 and a data packet corresponding to the service information 2. In this case, it can be learned from the first correspondence that an MCS table corresponding to the service information 1 is the MCS table 2, and an MCS table corresponding to the service information 2 is an MCS table 1. Therefore, only the data packet corresponding to the service information 1 can be transmitted on the transmission resource, so that the transmission resource is allocated to the data packet corresponding to the service information 1.

For example, the second transmission parameter corresponding to the transmission resource is the information about the air interface used by the transmission resource. It is assumed that the air interface used by the transmission resource is an air interface 1, and the at least one currently arrived data packet includes a data packet corresponding to the service information 1 and a data packet corresponding to the service information 2. In this case, it can be learned from the first correspondence that air interfaces corresponding to the service information 1 are the air interface 1 and an air interface 2, and air interfaces corresponding to the service information 2 are the air interface 1 and an air interface 3. Therefore, the data packet corresponding to the service information 1 and the data packet corresponding to the service information 2 each can be transmitted on the transmission resource, so that the transmission resource is allocated to the data packet corresponding to the service information 1 and/or the data packet corresponding to the service information 2, where a quantity of resources allocated to each of the data packet corresponding to the service information 1 and the data packet corresponding to the service information 2 is not limited.

In this embodiment, the terminal device obtains the first correspondence between service information and a first transmission parameter, where the service information includes any one or more of the following information: the service identifier, the QFI of the service, the PPPP of the service, or the PPPR of the service; and the first transmission parameter includes any one or more of the following parameters: the information about the allowed SCS, the maximum PSSCH duration, the information about the allowed cell, the information about the allowed frequency, the information about the minimum block error rate, the information about the allowed first-type resource, the information about the allowed second-type resource, the information about the allowed MCS table, or the information about the allowed air interface; obtains the transmission resource and the second transmission parameter corresponding to the transmission resource; and allocates, based on the first correspondence and the second transmission parameter corresponding to the transmission resource, the transmission resource to the data packet corresponding to the service information. According to the method, different transmission parameters can be selected for data packets corresponding to different services, different PPPPs/PPPRs, or different QFIs based on service information of the data packets, so that the transmission parameters can meet service requirements.

Figure 3:
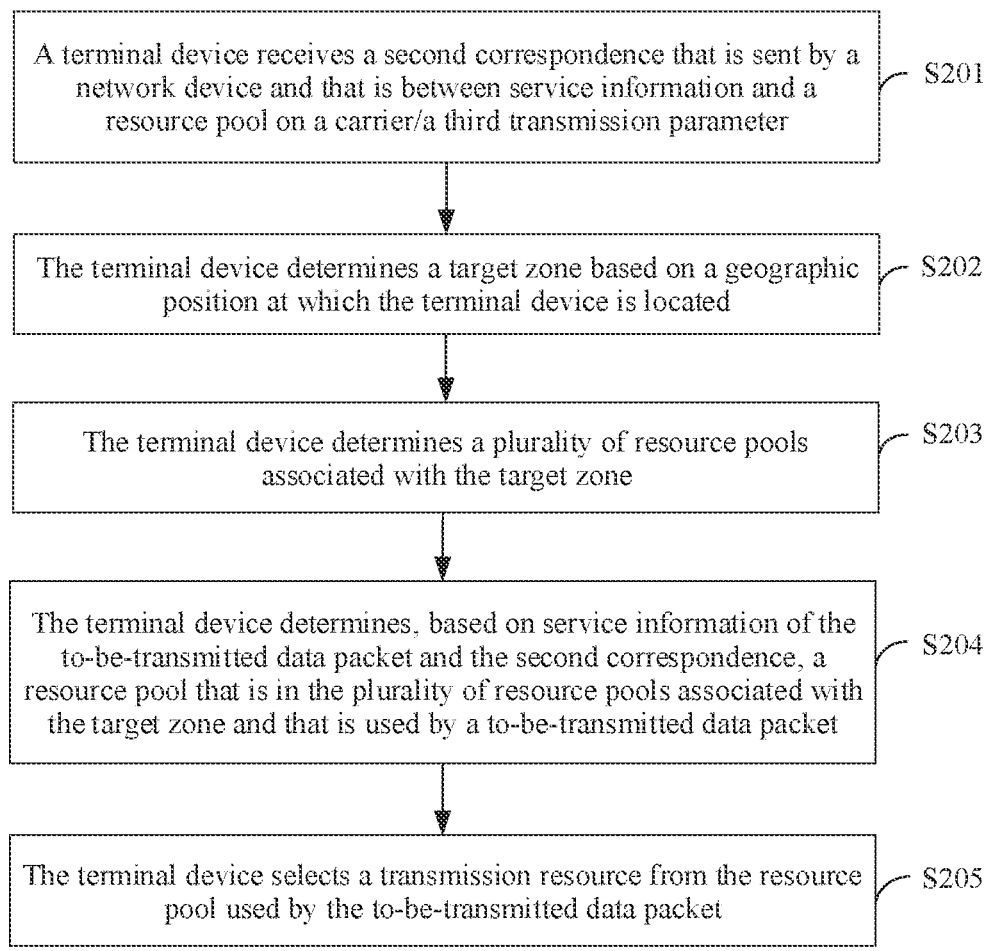
FIG. 3 is a flowchart of a transmission resource obtaining method according to an embodiment 2 of this application.

An embodiment 2 of this application provides a transmission resource obtaining method. A transmission resource obtained in this embodiment is a first-type resource. The method in this embodiment may be independently used, or may be used in combination with the method in the embodiment 1. For example, the terminal device in the embodiment 1 may obtain a transmission resource by using the method in this embodiment. FIG. 3 is a flowchart of the transmission resource obtaining method according to the embodiment 2 of this application. As shown in FIG. 3, the method provided in this embodiment includes the following steps.

Step S201: A terminal device receives a second correspondence that is sent by a network device and that is between service information and a resource pool on a carrier/a third transmission parameter.

The network device may configure a plurality of resource pools on one carrier, the plurality of resource pools on the carrier correspond to a plurality of zone identifiers (zone ID), the zone identifier is used to identify a zone, and each zone is associated with at least one resource pool. Different from the current technology, in this embodiment, each zone is associated with a plurality of resource pools, the plurality of resource pools associated with each zone correspond to different transmission parameters, resource pools associated with a plurality of zones may overlap or may not overlap, and resource pools associated with different zones may correspond to a same transmission parameter or different transmission parameters.

Figure 4:
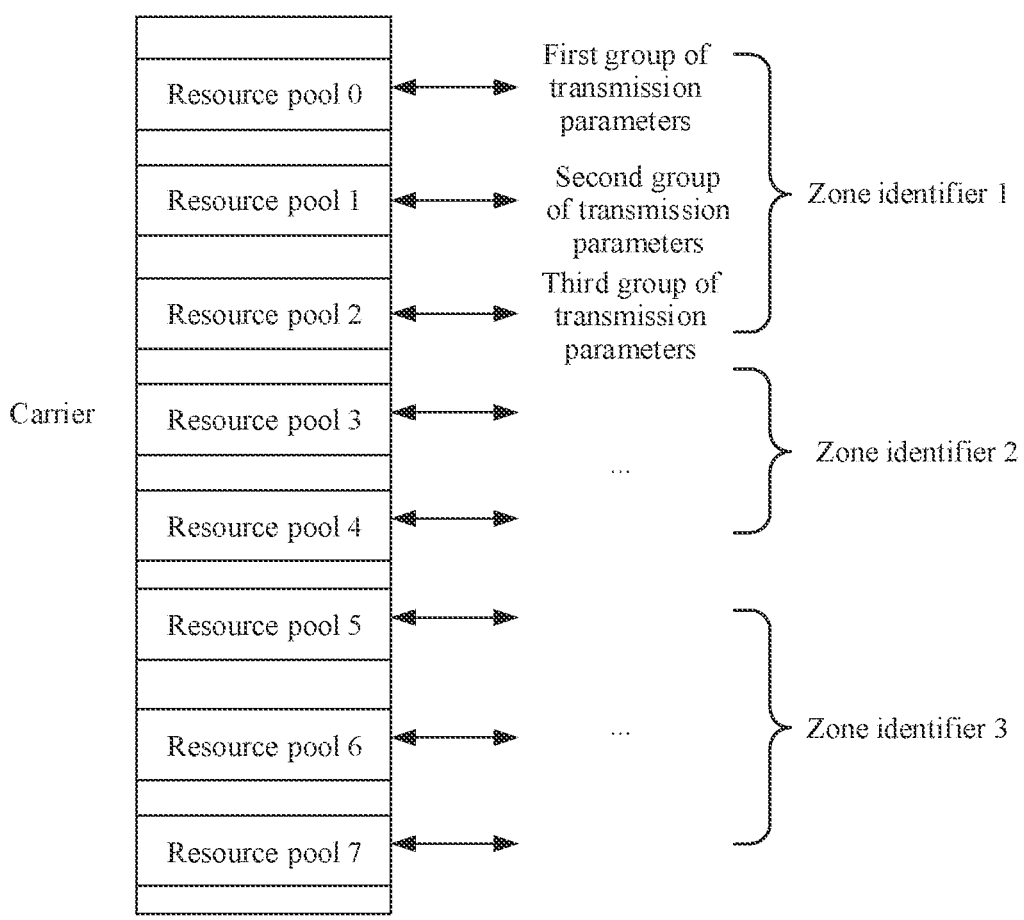
FIG. 4 is a schematic diagram of a correspondence among a resource pool on a carrier, a zone identifier, and a transmission parameter.

FIG. 4 is a schematic diagram of a correspondence among a resource pool on a carrier, a zone identifier, and a transmission parameter. As shown in FIG. 4, the carrier includes N resource pools in total, where a value of N may be 8; a resource pool 0, a resource pool 1, and a resource pool 2 are associated with a zone corresponding to a zone identifier 1, a resource pool 3 and a resource pool 4 are associated with a zone corresponding to a zone identifier 2, and a resource pool 5, a resource pool 6, and a resource pool 7 are associated with a zone corresponding to a zone identifier 3; and the resource pool 1 corresponds to the first group of transmission parameters, the resource pool 2 corresponds to the second group of transmission parameters, and the resource pool 3 corresponds to the third group of transmission parameters, where each group of transmission parameters may be a numerology (a parameter set), and the numerology may include one or more of an SCS, a cyclic prefix, a TTI, or the like.

The network device may configure the second correspondence between service information and a resource pool on a carrier. The service information may be a PPPP, a PPPR, or a service identifier, or may be another parameter that can reflect QoS, for example, a QFI. The PPPP is used as an example. The network device may configure that a PPPP 1 corresponds to resource pools associated with the zone identifier 1, and configure that a PPPP 2 corresponds to resource pools associated with the zone identifier 2. A transmission parameter corresponding to each resource pool is known. In this case, the terminal device may learn of a resource pool corresponding to the service information and a third transmission parameter based on the transmission parameter corresponding to each resource pool on the carrier and the second correspondence between service information and a resource pool on a carrier.

The network device may alternatively configure the second correspondence between service information and a third transmission parameter. A transmission parameter corresponding to each resource pool on the carrier is known. In this case, the terminal device may learn of a resource pool corresponding to the service information based on the transmission parameter corresponding to the resource pool and the second correspondence between service information and a third transmission parameter. In this embodiment, the third transmission parameter is associated with the first transmission parameter, or the third transmission parameter belongs to the first transmission parameter.

Step S202: The terminal device determines a target zone based on a geographic position at which the terminal device is located.

For example, the terminal device calculates a zone identifier according to the following formulas:

$x1 = \text{Floor}(x/L) \bmod Nx;$ $y1 = \text{Floor}(y/W) \bmod Ny;$ and $\text{Zone\_id} = y1 * Nx + x1.$ x1 is a length of a geographic zone, y1 is a width of the geographic zone, Nx is a total quantity of longitude-related zones, and Ny is a total quantity of latitude-related zones.

Step S203: The terminal device determines a plurality of resource pools associated with the target zone.

The terminal device determines the plurality of resource pools associated with the target zone based on an identifier of the target zone.

Step S204: The terminal device determines, based on service information of the to-be-transmitted data packet and the second correspondence, a resource pool that is in the plurality of resource pools associated with the target zone and that is used by a to-be-transmitted data packet.

For example, the second correspondence is a correspondence between service information and a resource pool on a carrier. The terminal device knows the service information of the to-be-transmitted data packet and the plurality of resource pools associated with the target zone. In this case, the terminal device determines, based on the plurality of resource pools associated with the target zone and the second correspondence, service information respectively corresponding to the plurality of resource pools associated with the target zone; and selects, based on the service information respectively corresponding to the plurality of resource pools associated with the target zone and the service information of the to-be-transmitted data packet, a resource pool that is in the plurality of resource pools associated with the target zone and that meets the service information of the to-be-transmitted data packet as the resource pool used by the to-be-transmitted data packet. For example, when the service information of the to-be-transmitted data packet is a PPPR, the terminal device first determines a highest PPPR level of the to-be-transmitted data packet, for example, a PPPR=a, and the terminal device selects, from the plurality of resource pools corresponding to the identifier of the target zone, a resource pool associated with the PPPR a as the resource pool used by the to-be-transmitted data packet.

For example, the second correspondence is a correspondence between service information and a third transmission parameter. The terminal device knows the service information of the to-be-transmitted data packet. In this case, the terminal device determines, based on the service information of the to-be-transmitted data packet and the second correspondence, a transmission parameter used by the to-be-transmitted data packet. In addition, a transmission parameter used by each resource pool on the carrier is known. In this case, the terminal device determines, based on the transmission parameter used by each resource pool, a resource pool that is in the plurality of resource pools associated with the target zone and that meets the transmission parameter used by the to-be-transmitted data packet as the resource pool used by the to-be-transmitted data packet. For example, when the service information of the to-be-transmitted data packet is a PPPR and a transmission parameter of the to-be-transmitted data packet is an SCS, the terminal device first determines a highest PPPR level of the to-be-transmitted data packet, for example, a PPPR=a, determines an SCS associated with the PPPR a, for example, an SCS=b, and the terminal device selects, from the plurality of resource pools corresponding to the identifier of the target zone, a resource pool corresponding to the SCS=b as the resource pool used by the to-be-transmitted data packet.

Step S205: The terminal device selects a transmission resource from the resource pool used by the to-be-transmitted data packet.

There may be one or a plurality of resource pools that are determined by the terminal device and that are used by the to-be-transmitted data packet, and when there are a plurality of resource pools used by the to-be-transmitted data packet, the terminal device may determine one resource pool according to any one of the following rules:

(1) One resource pool with minimum load is selected from the plurality of resource pools used by the data packet based on load of the resource pools, and the transmission resource is selected from the resource pool with the minimum load. Load of the resource pool may be measured by using a channel busy ratio (CBR), and the terminal device may separately measure a CBR of each resource pool.

(2) The network device sets a correspondence between service information and a CBR. For example, the network device specifies that data corresponding to a specific PPPR/PPPP/service identifier can be transmitted only on a transmission resource in a resource pool whose CBR is not greater than a corresponding CBR threshold. The terminal device selects, from the plurality of resource pools used by the data packet based on the correspondence, one resource pool that meets a CBR threshold requirement.

Figure 5:
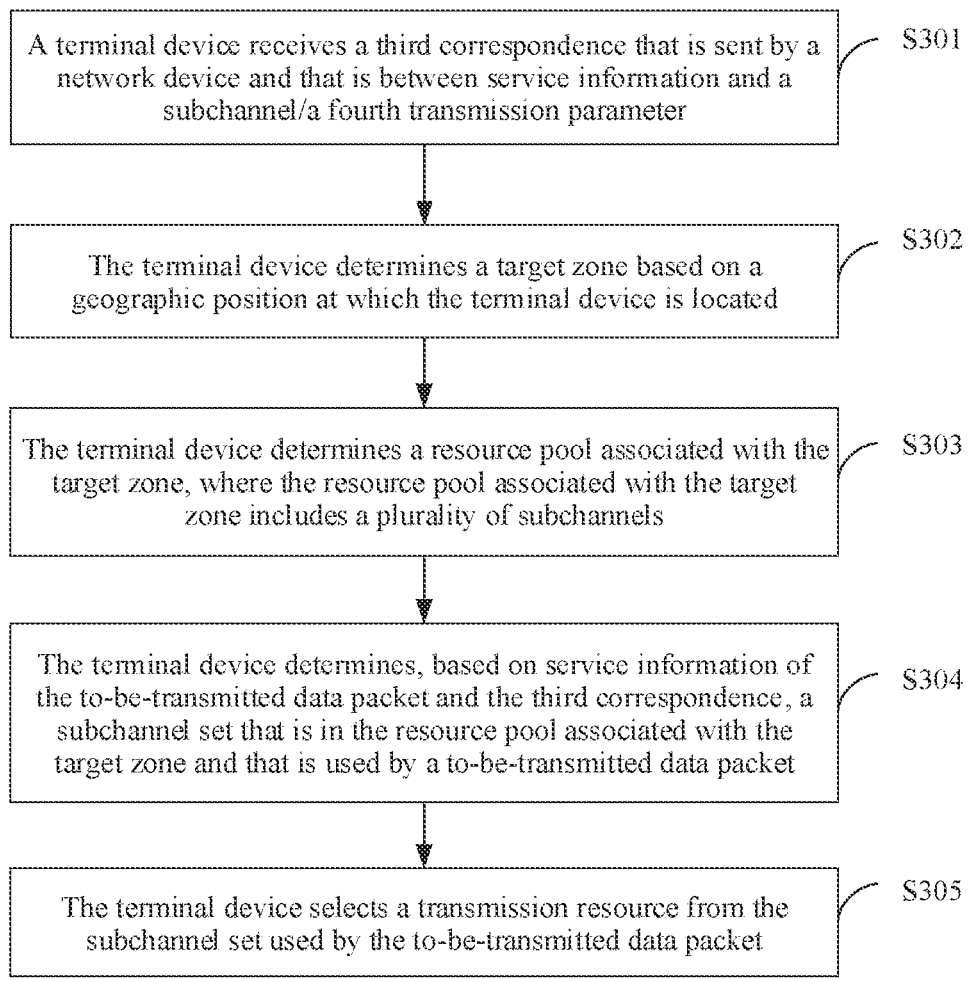
FIG. 5 is a flowchart of a transmission resource obtaining method according to an embodiment 3 of this application.

An embodiment 3 of this application provides a transmission resource obtaining method. A transmission resource obtained in this embodiment is a first-type resource. The method in this embodiment may be independently used, or may be used in combination with the method in the embodiment 1. For example, the terminal device in the embodiment 1 may obtain a transmission resource by using the method in this embodiment. FIG. 5 is a flowchart of the transmission resource obtaining method according to the embodiment 3 of this application. As shown in FIG. 5, the method provided in this embodiment includes the following steps.

Step S301: A terminal device receives a third correspondence that is sent by a network device and that is between service information and a subchannel/a fourth transmission parameter.

The network device may configure a plurality of resource pools on one carrier, each resource pool on the carrier is associated with one zone, and different zones are distinguished by using zone identifiers. Different from the current technology, in this embodiment, the network device divides each resource pool into a plurality of subchannels, and configures a transmission parameter used by each subchannel, where each subchannel includes a plurality of physical layer resource blocks, the plurality of subchannels included in each resource pool correspond to different transmission parameters, and subchannels in different resource pools may correspond to a same transmission parameter or different transmission parameters. In this embodiment, the fourth transmission parameter is associated with the first transmission parameter, or the fourth transmission parameter belongs to the first transmission parameter.

Figure 6:
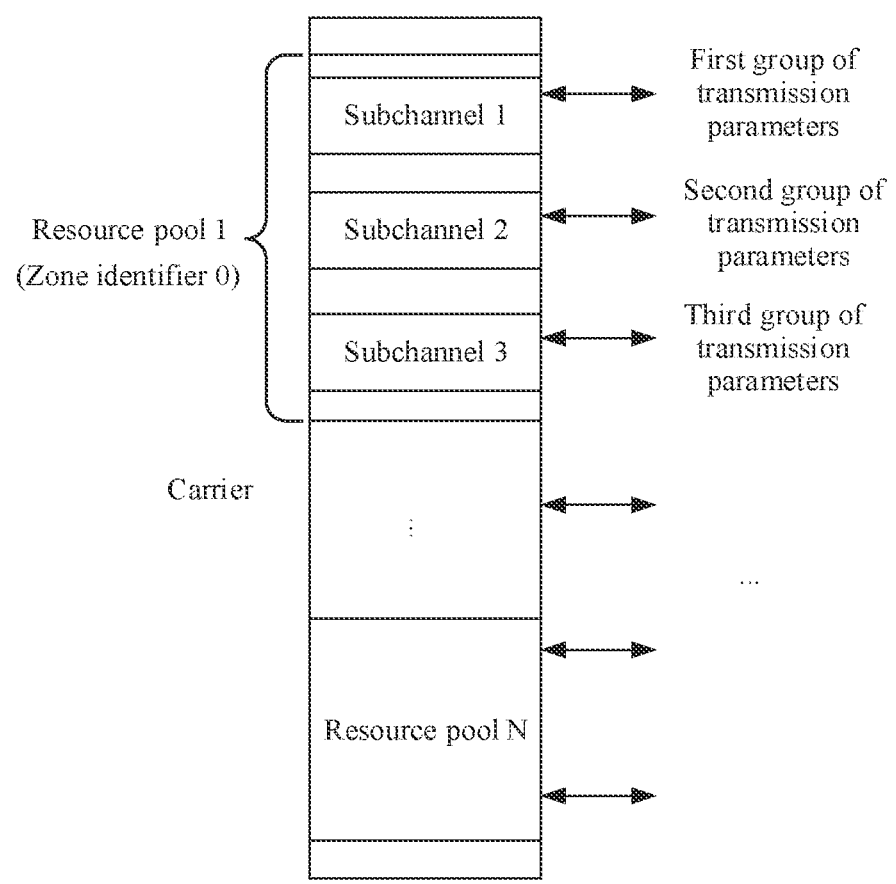
FIG. 6 is a schematic diagram of a correspondence among a resource pool on a carrier, a subchannel, and a transmission parameter.

FIG. 6 is a schematic diagram of a correspondence among a resource pool on a carrier, a subchannel, and a transmission parameter. As shown in FIG. 6, the carrier includes N resource pools in total, where each resource pool corresponds to one zone identifier, and each resource pool includes a plurality of subchannels. A resource pool 1 is used as an example. A zone associated with the resource pool 1 is a zone corresponding to a zone identifier 0, and the resource pool 1 includes three subchannels: a subchannel 1, a subchannel 2, and a subchannel 3, where the subchannel 1 corresponds to the first group of transmission parameters, the subchannel 2 corresponds to the second group of transmission parameters, the subchannel 3 corresponds to the third group of transmission parameters, and each group of transmission parameters may be one numerology.

The network device may configure the third correspondence between service information and a subchannel. The service information may be a PPPP, a PPPR, or a service identifier, or may be another parameter that can reflect QoS. The PPPP is used as an example. The network device may configure that a PPPP 1 corresponds to the subchannel 1, and configure that a PPPP 2 corresponds to the subchannel 2. A transmission parameter corresponding to each subchannel is known. In this case, the terminal device may learn of a transmission parameter corresponding to the service information based on the transmission parameter corresponding to each subchannel and the third correspondence between service information and a subchannel.

The network device may alternatively configure the third correspondence between service information and a fourth transmission parameter. A transmission parameter corresponding to each subchannel in a resource pool is known. In this case, the terminal device may learn of a resource pool corresponding to the service information based on the transmission parameter corresponding to each subchannel in the resource pool and the third correspondence between service information and a fourth transmission parameter.

Step S302: The terminal device determines a target zone based on a geographic position at which the terminal device is located.

For a specific implementation of this step, refer to related descriptions of step S202 in the embodiment 2. Details are not described herein again.

Step S303: The terminal device determines a resource pool associated with the target zone, where the resource pool associated with the target zone includes a plurality of subchannels.

In this embodiment, the target zone is associated with one resource pool, and the resource pool includes a plurality of subchannels.

Step S304: The terminal device determines, based on service information of the to-be-transmitted data packet and the third correspondence, a subchannel set that is in the resource pool associated with the target zone and that is used by a to-be-transmitted data packet.

For example, the third correspondence is a correspondence between service information and a subchannel. The terminal device knows the service information of the to-be-transmitted data packet and the plurality of subchannels included in the resource pool associated with the target zone. In this case, the terminal device determines, based on the plurality of subchannels included in the resource pool associated with the target zone and the third correspondence, service information respectively corresponding to the plurality of subchannels included in the resource pool associated with the target zone; and selects, based on the service information respectively corresponding to the plurality of subchannels included in the resource pool associated with the target zone and the service information of the to-be-transmitted data packet, a subchannel that is in the plurality of subchannels included in the resource pool associated with the target zone and that meets the service information of the to-be-transmitted data packet as the subchannel set used by the to-be-transmitted data packet.

For example, the third correspondence is a correspondence between service information and a fourth transmission parameter. The terminal device knows the service information of the to-be-transmitted data packet. In this case, the terminal device determines, based on the service information of the to-be-transmitted data packet and the third correspondence, a transmission parameter used by the to-be-transmitted data packet. In addition, transmission parameters corresponding to the plurality of subchannels included in the resource pool associated with the target zone are known. In this case, the terminal device determines, based on the transmission parameters corresponding to the plurality of subchannels included in the resource pool associated with the target zone, a subchannel that is in the plurality of subchannels included in the resource pool associated with the target zone and that meets the transmission parameter used by the to-be-transmitted data packet as the subchannel set used by the to-be-transmitted data packet.

Step S305: The terminal device selects a transmission resource from the subchannel set used by the to-be-transmitted data packet.

In this embodiment, a correspondence between a resource pool and a zone may not be configured, and subchannels of resource pools included in the carrier are planned in a unified manner. Correspondingly, the foregoing step S302 and step S303 do not need to be performed. When a data packet arrives at the terminal device, the terminal device determines, based on the service information of the to-be-transmitted data packet and the third correspondence, a subchannel set that is in the subchannels included in the carrier and that is used by the to-be-transmitted data packet, where the subchannel set used by the to-be-transmitted data packet may include one or more subchannels, and the one or more subchannels in the subchannel set may belong to one resource pool or may belong to a plurality of resource pools.

When the subchannel set used by the to-be-transmitted data packet includes a plurality of subchannels, the terminal device may determine one subchannel according to any one of the following rules:

(1) One subchannel with minimum load is selected from the plurality of subchannels used by the data packet based on load of the subchannels, and the transmission resource is selected from the subchannel with the minimum load. Load of the subchannel may be measured by using a CBR. The terminal device may separately measure a CBR of each subchannel. Alternatively, the terminal device may measure a CBR of a resource pool, and in this case. CBRs of subchannels included in the resource pool are the same.

(2) The network device sets a correspondence between service information and a CBR. For example, the network device specifies that data corresponding to a specific PPPR/PPPP/service identifier can be transmitted only on a subchannel whose CBR is not greater than a corresponding CBR threshold. The terminal device selects, from the plurality of subchannels used by the data packet based on the correspondence, one subchannel that meets a CBR threshold requirement.

To support a plurality of services or to save power, a multi-bandwidth part (BWP) technology is introduced into an NR system, and SCSs or frequencies of different BWPs are different. There is only one active BWP in a time period, and the terminal device performs the following operations on the active BWP: monitoring a PDCCH and sending data. For example, a BWP 1 supports a service 1, and a BWP 2 supports a service 2. If only data of the service 1 arrives currently, the active BWP is switched to the BWP 1. If only data of the service 2 arrives currently, the active BWP is switched to the BWP 2. Alternatively, bandwidth of the BWP 1 is relatively large, and bandwidth of the BWP 2 is relatively small. If a large amount of data arrives currently, the active BWP is switched to the BWP 1. If a small amount of data arrives currently, the active BWP is switched to the BWP 2.

Figure 7:
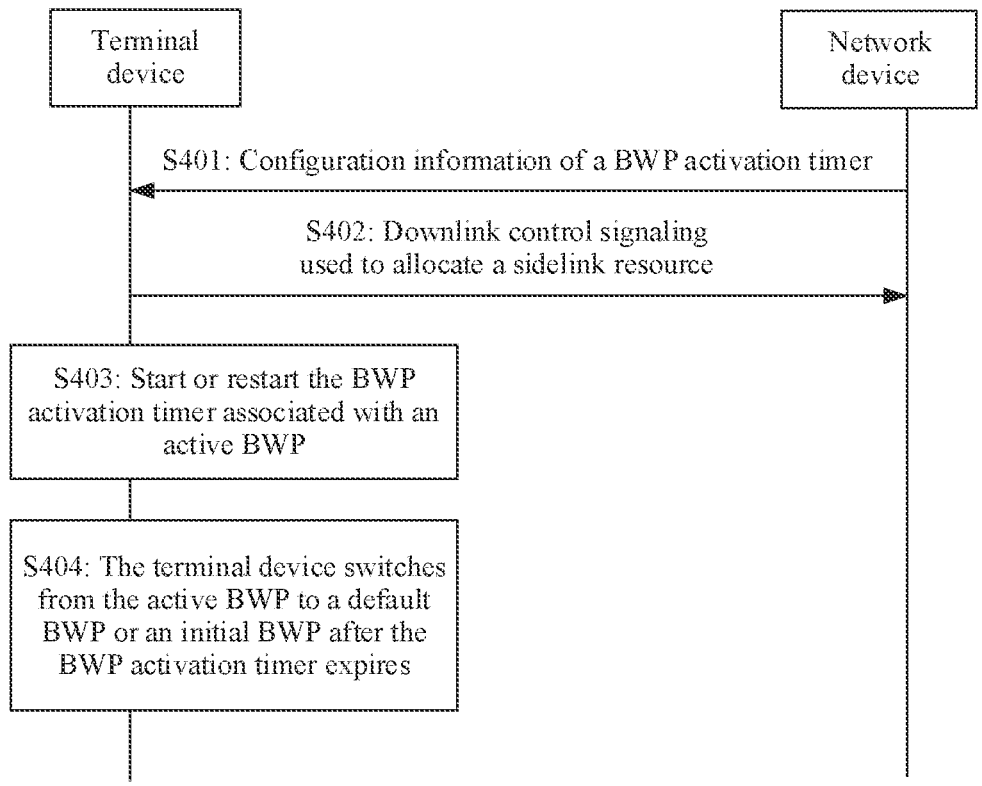
FIG. 7 is a signaling flowchart of a BWP switching method according to an embodiment 4 of this application.

When determining to perform BWP switching, the network device sends a BWP switching command to the terminal device. Because there is no feedback to the BWP switching command, the network device cannot determine whether the terminal device successfully receives the BWP switching command. To resolve this problem, a BWP activation timer (bwp-activitytimer) is introduced in this embodiment. The BWP activation timer is configured to control the BWP switching, for example, control an active BWP of the terminal device to be switched from a current BWP to a default BWP or an initial BWP after timeout. The default BWP is a Uu interface BWP (Uu BWP), and is configured by the network device. The initial BWP is a BWP used by the terminal device to initially access a cell, and is also a Uu interface BWP. FIG. 7 is a signaling flowchart of a BWP switching method according to an embodiment 4 of this application. As shown in FIG. 7, the method in this embodiment includes the following steps.

Step S401: A network device sends configuration information of a BWP activation timer to a terminal device.

The terminal device receives the configuration information that is of the BWP activation timer and that is sent by the network device, and completes configuration of the BWP activation timer. The configuration information of the BWP activation timer includes at least one of the following: timing duration of a Uu BWP activation timer, a start condition, a stop condition, and the like.

Step S402: The network device sends, to the terminal device, downlink control signaling used to allocate a sidelink resource.

The network device sends, by using an active Uu BWP of a serving cell, the downlink control signaling to the terminal device, where a PDCCH in which the downlink control signaling is transmitted is scrambled by using a sidelink C-RNTI (where in this case, the downlink control signaling is used to allocate a dynamic scheduling sidelink resource) or a sidelink CS-RNTI (where in this case, the downlink control signaling is used to allocate a semi-persistent scheduling sidelink resource).

Optionally, the downlink control signaling may include a Uu BWP switching command, the switching command includes a Uu BWP identifier, and the Uu BWP identifier is used to indicate the terminal device to switch to a Uu BWP corresponding to the Uu BWP identifier.

For example, the network device configures three BWPs for a serving cell of the terminal device: a BWP 1, a BWP 2, and a BWP 3, where a maximum of one BWP is active. It is assumed that a current active BWP is the BWP 1. In this case, the terminal device monitors only a PDCCH in the BWP 1. If the terminal device receives downlink control signaling in the BWP 1, and the downlink control signaling includes identification information of the BWP 2 and sidelink resource allocation indication information, the active BWP of the terminal device is switched from the BWP 1 to the BWP 2, where the BWP 2 is an active BWP, and the terminal device monitors only a PDCCH of the BWP 2.

After receiving the downlink control signaling used to allocate the sidelink resource, optionally, the terminal device may further perform the following operation: If there is no ongoing random access process associated with the serving cell of the terminal device, or if a PDCCH scrambled by using a C-RNTI is successfully received in an ongoing random access process associated with the serving cell, the terminal device starts or restarts the BWP activation timer associated with the active BWP.

Step S403: The terminal device starts or restarts the BWP activation timer associated with the active BWP.

During running of the BWP activation timer, the terminal device determines that the active BWP is in an active state.

Optionally, if the downlink control signaling carries a BWP switching command, the terminal device may start or restart the BWP activation timer after completing BWP switching. Optionally, if the BWP switching command is used to indicate the terminal device to switch to a default BWP or an initial BWP, the terminal device may not start the BWP activation timer. Alternatively, the terminal device may start or restart the BWP activation timer before BWP switching. This is not limited in this embodiment.

Step S404: After the BWP activation timer expires, the terminal device switches from the active BWP to the default BWP or the initial BWP.

After sending the BWP switching command, the network device also starts or restarts the BWP activation timer. If the default BWP is configured after the BWP activation timer expires, the network device switches to the default BWP. If no default BWP is configured, the network device switches to the initial BWP. This ensures that active BWPs of the network device and the terminal device are consistent.

In this embodiment, the terminal device receives the downlink control signaling that is sent by the network device and that is used to allocate the sidelink resource, starts or restarts the BWP activation timer based on the downlink control signaling, and switches from the active BWP to the default BWP or the initial BWP after the BWP activation timer expires. In the method, even if the BWP switching command is lost, the active BWPs of the network device and the terminal device can keep consistent.

For example, the method in this embodiment may be independently used in a BWP switching process. Alternatively, the method may be used in combination with the method in the embodiment 1, to be specific, when a PDCCH is used to allocate a dynamic scheduling resource, a Uu BWP identifier is carried in the PDCCH; and after the terminal device receives the PDCCH, BWP switching is performed based on the BWP identifier carried in the PDCCH. The dynamic scheduling resource mentioned in this embodiment of this application is a resource used for sidelink transmission rather than a resource used for Uu interface transmission. To distinguish between a dynamic scheduling resource used for the sidelink transmission and a dynamic scheduling resource used for the Uu interface transmission, PDCCHs may be scrambled by using different scrambling codes. For example, a PDCCH used to allocate the dynamic scheduling resource for the sidelink transmission is scrambled by using a V2X-C-RNTI, and a PDCCH used to allocate the dynamic scheduling resource for the Uu interface transmission is scrambled by using a C-RNTI.

Figure 8:
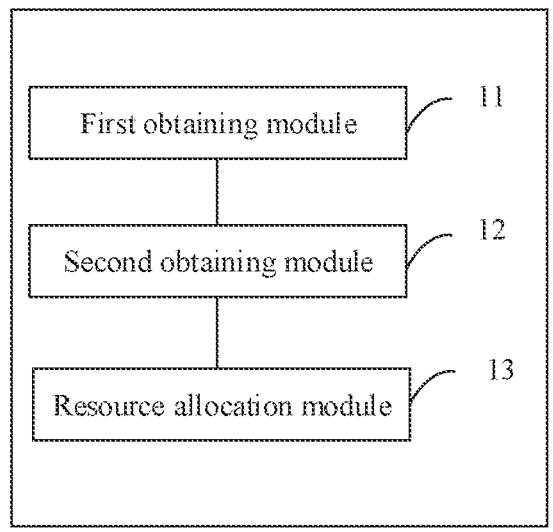
FIG. 8 is a schematic structural diagram of a V2X communications apparatus according to an embodiment 5 of this application.

FIG. 8 is a schematic structural diagram of a V2X communications apparatus according to an embodiment 5 of this application. The apparatus may be used in a terminal device. As shown in FIG. 8, the apparatus provided in this embodiment includes:

a first obtaining module 11, configured to obtain a first correspondence between service information and a first transmission parameter, where the service information includes any one or more of the following information: a service identifier, a ProSe per-packet priority PPPP of a service, a ProSe per-packet reliability PPPR of a service, or a quality of service flow identifier QFI;

a second obtaining module 12, configured to obtain a transmission resource and a second transmission parameter corresponding to the transmission resource, where the second transmission parameter has an association relationship with the first transmission parameter, or the second transmission parameter belongs to the first transmission parameter; and a resource allocation module 13, configured to allocate, based on the first correspondence and the second transmission parameter corresponding to the transmission resource, the transmission resource to a data packet corresponding to the service information.

In an example, the first transmission parameter includes any one or more of the following parameters: information about an allowed subcarrier spacing SCS, a maximum physical sidelink shared channel PSSCH duration, information about an allowed cell, information about an allowed frequency, information about a minimum block error rate, information about an allowed first-type resource, information about an allowed second-type resource, information about an allowed modulation and coding scheme MCS table, or information about an allowed air interface, where the first-type resource is a resource preconfigured by a network device, and the second-type resource is a semi-persistent scheduling resource or a dynamic scheduling resource.

In another example, the first correspondence is prestored in the terminal device; or the first correspondence is sent by the network device to the terminal device.

In another example, the second obtaining module 12 is specifically configured to: receive indication information that is of the second transmission parameter corresponding to the transmission resource and that is sent by the network device; or receive indication information that is of association information of the second transmission parameter corresponding to the transmission resource and that is sent by the network device; and determine, based on the indication information of the association information of the second transmission parameter corresponding to the transmission resource, the second transmission parameter corresponding to the transmission resource.

In another example, the second obtaining module 12 is specifically configured to: determine, based on the service information of the to-be-transmitted data packet and the first correspondence, a transmission parameter meeting the service information of the to-be-transmitted data packet as the second transmission parameter corresponding to the transmission resource.

In another example, the second obtaining module 12 is specifically configured to: when the terminal device is not in coverage of the network device, determine a default transmission parameter as the second transmission parameter corresponding to the transmission resource.

In another example, the second obtaining module 12 is specifically configured to:

receive a second correspondence that is sent by the network device and that is between service information and a resource pool on a carrier/a third transmission parameter, where a plurality of resource pools on the carrier correspond to a plurality of zone identifiers, each zone is associated with a plurality of resource pools, the plurality of resource pools associated with each zone correspond to different transmission parameters, resource pools associated with a plurality of zones do not overlap, and the third transmission parameter is associated with the first transmission parameter, or the third transmission parameter belongs to the first transmission parameter;

determine a target zone based on a geographic position at which the apparatus is located:

determine a plurality of resource pools associated with the target zone;

determine, based on the service information of the to-be-transmitted data packet and the second correspondence, a resource pool that is in the plurality of resource pools associated with the target zone and that is used by the to-be-transmitted data packet; and select the transmission resource from the resource pool used by the to-be-transmitted data packet.

In another example, the second obtaining module 12 is specifically configured to:

receive a third correspondence that is sent by the network device and that is between service information and a subchannel/a fourth transmission parameter, where a carrier includes a plurality of resource pools, each resource pool includes a plurality of subchannels, the plurality of subchannels included in each resource pool correspond to different transmission parameters, and the fourth transmission parameter is associated with the first transmission parameter, or the fourth transmission parameter belongs to the first transmission parameter;

determine, based on the service information of the to-be-transmitted data packet and the third correspondence, a subchannel set that is in subchannels included in the carrier and that is used by the to-be-transmitted data packet; and select the transmission resource from the subchannel set used by the to-be-transmitted data packet.

The apparatus in this embodiment may be configured to perform the method steps performed by the terminal device in the embodiment 1 to the embodiment 3. Specific implementations and technical effects are similar to those in the embodiment 1 to the embodiment 3, and details are not described herein again.

Figure 9:
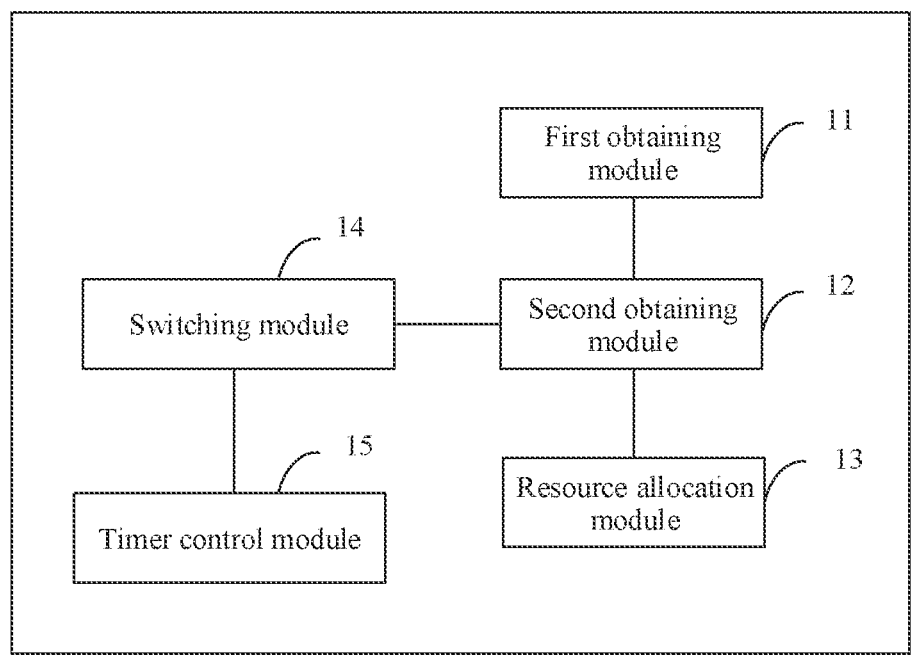
FIG. 9 is a schematic structural diagram of a V2X communications apparatus according to an embodiment 6 of this application.

FIG. 9 is a schematic structural diagram of a V2X communications apparatus according to an embodiment 6 of this application. The apparatus in this embodiment is based on the apparatus shown in FIG. 8, and the second obtaining module 12 is specifically configured to: receive information that is about the transmission resource and that is sent by the network device, where the transmission resource is a dynamic scheduling resource, the information about the transmission resource is carried on a physical downlink control channel PDCCH, and the PDCCH further carries a bandwidth part BWP identifier.

Correspondingly, the apparatus further includes:

a switching module 14, configured to: when the terminal device receives the PDCCH, switch, based on the BWP identifier, from a current BWP to a BWP corresponding to the BWP identifier; and a timer control module 15, configured to start or restart a BWP activation timer, where the BWP activation timer is configured to control the terminal device to switch from the current BWP to a default BWP or an initial BWP after timeout, and the initial BWP is a BWP used by the terminal device to initially access a cell.

An embodiment 7 of this application provides a V2X communications apparatus. The apparatus in this embodiment may be used in a network device, and the apparatus in this embodiment includes:

a sending module, configured to send a first correspondence between service information and a first transmission parameter to a terminal device, where the service information includes any one or more of the following information: a service identifier, a ProSe per-packet priority PPPP of a service, a ProSe per-packet reliability PPPR of a service, or a quality of service flow identifier QFI; and the first transmission parameter includes any one or more of the following parameters: information about an allowed subcarrier spacing SCS, a maximum physical sidelink shared channel PSSCH duration, information about an allowed cell, information about an allowed frequency, information about a minimum block error rate, information about an allowed first-type resource, information about an allowed second-type resource, information about an allowed modulation and coding scheme MCS table, or information about an allowed air interface, where the first-type resource is a resource preconfigured by the network device, and the second-type resource is a semi-persistent scheduling resource or a dynamic scheduling resource.

In an example, the sending module is further configured to:
send a physical downlink control channel PDCCH to the terminal device, where the PDCCH includes information about a transmission resource and a bandwidth part BWP identifier, and the BWP identifier is used to indicate the terminal device to switch to a BWP corresponding to the BWP identifier.

In another example, the sending module is further configured to:
send configuration information of a BWP activation timer to the terminal device, where the BWP activation timer is configured to control the terminal device to switch from a current BWP to a default BWP or an initial BWP after timeout, and the initial BWP is a BWP used by the terminal device for initial access.

In another example, the sending module is further configured to:
send a second correspondence between service information and a resource pool on a carrier/a third transmission parameter to the terminal device, where a plurality of resource pools on the carrier correspond to a plurality of zone identifiers, each zone is associated with a plurality of resource pools, the plurality of resource pools associated with each zone correspond to different transmission parameters, resource pools associated with a plurality of zones do not overlap, and the third transmission parameter is associated with the first transmission parameter, or the third transmission parameter belongs to the first transmission parameter.

In another example, the sending module is further configured to:
send a third correspondence between service information and a subchannel/a fourth transmission parameter to the terminal device, where a carrier includes a plurality of resource pools, each resource pool includes a plurality of subchannels, the plurality of subchannels included in each resource pool correspond to different transmission parameters, and the fourth transmission parameter is associated with the first transmission parameter, or the fourth transmission parameter belongs to the first transmission parameter.

Figure 10:
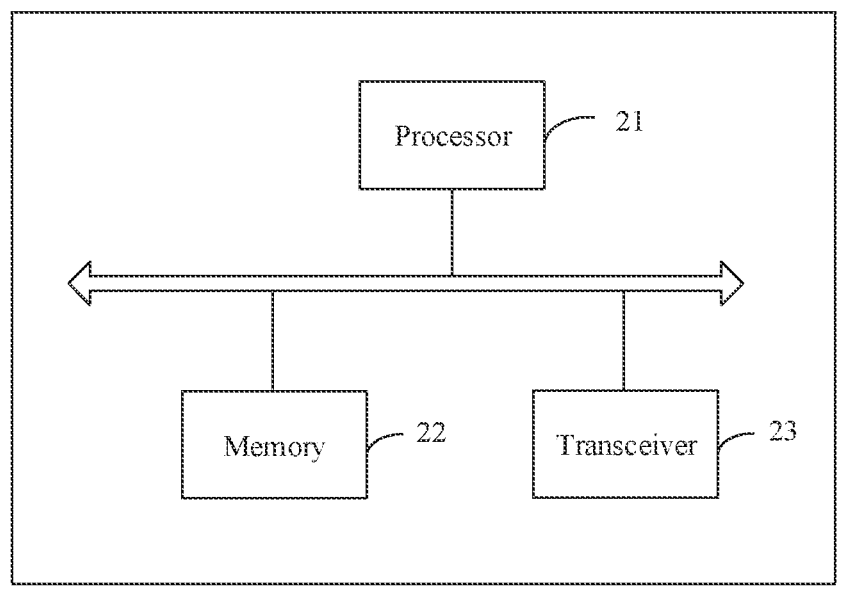
FIG. 10 is a schematic structural diagram of a terminal device according to an embodiment 8 of this application.

FIG. 10 is a schematic structural diagram of a terminal device according to an embodiment 8 of this application. As shown in FIG. 10, the terminal device provided in this embodiment includes a processor 21, a memory 22, and a transceiver 23. The memory 22 is configured to store an instruction, the transceiver 23 is configured to communicate with another device, and the processor 21 is configured to execute the instruction stored in the memory 22, so that the terminal device performs the method steps performed by the terminal device in the embodiment 1 to the embodiment 4 of this application. Specific implementations and technical effects are similar to those in the embodiment 1 to the embodiment 4, and details are not described herein again.

Figure 11:
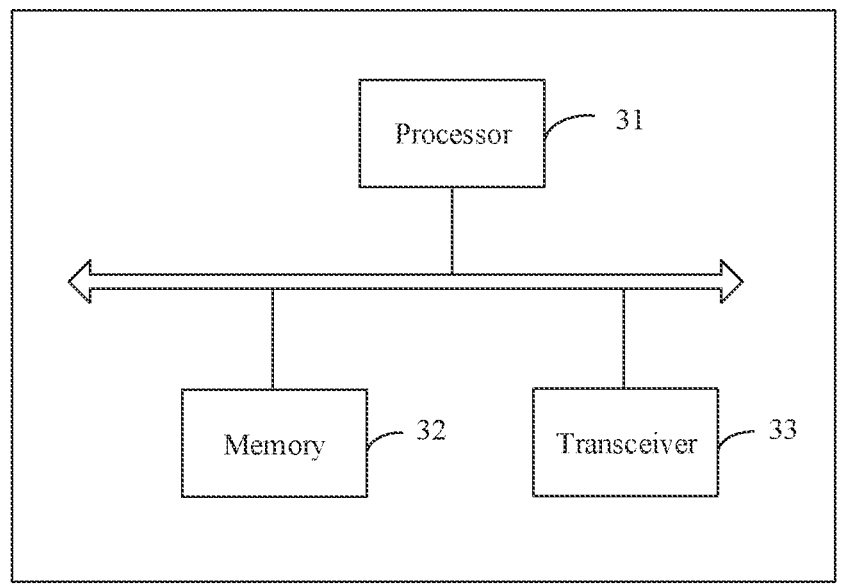
FIG. 11 is a schematic structural diagram of a network device according to an embodiment 9 of this application.

FIG. 11 is a schematic structural diagram of a network device according to an embodiment 9 of this application. As shown in FIG. 11, the network device provided in this embodiment includes a processor 31, a memory 32, and a transceiver 33. The memory 32 is configured to store an instruction, the transceiver 33 is configured to communicate with another device, and the processor 31 is configured to execute the instruction stored in the memory 32, so that the network device performs the method steps performed by the network device in the embodiment 1 to the embodiment 4 of this application. Specific implementations and technical effects are similar to those in the embodiment 1 to the embodiment 4, and details are not described herein again.

An embodiment 10 of this application provides a computer-readable storage medium. The computer-readable storage medium stores an instruction; and when the instruction is executed, a computer performs the method steps performed by the terminal device in the embodiment 1 to the embodiment 4 of this application. Specific implementations and technical effects are similar to those in the embodiment 1 to the embodiment 4, and details are not described herein again.

An embodiment 11 of this application provides a computer-readable storage medium. The computer-readable storage medium stores an instruction; and when the instruction is executed, a computer performs the method steps performed by the network device in the embodiment 1 to the embodiment 4 of this application. Specific implementations and technical effects are similar to those in the embodiment 1 to the embodiment 4, and details are not described herein again.

An embodiment 12 of this application provides a system-on-a-chip. The system-on-a-chip may be used in a terminal device, and the system-on-a-chip includes at least one communications interface, at least one processor, and at least one memory. The communications interface, the memory, and the processor are interconnected through a bus, and the processor executes an instruction stored in the memory, so that the terminal device can perform the method steps performed by the terminal device in the embodiment 1 to the embodiment 4 of this application. Specific implementations and technical effects are similar to those in the embodiment 1 to the embodiment 4, and details are not described herein again.

An embodiment 13 of this application provides a system-on-a-chip. The system-on-a-chip may be used in a network device, and the system-on-a-chip includes at least one communications interface, at least one processor, and at least one memory. The communications interface, the memory, and the processor are interconnected through a bus, and the processor executes an instruction stored in the memory, so that the network device can perform the method steps performed by the network device in the embodiment 1 to the embodiment 4 of this application. Specific implementations and technical effects are similar to those in the embodiment 1 to the embodiment 4, and details are not described herein again.

An embodiment 14 of this application provides a communications system. The communications system includes a terminal device and a network device. The terminal device is configured to perform the method steps performed by the terminal device in the embodiment 1 to the embodiment 4 of this application, and the network device is configured to perform the method steps performed by the network device in the embodiment 1 to the embodiment 4 of this application.

It may be understood that the processor used in the network device or the terminal device in the embodiments of this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

The bus in the embodiments of this application may be an industry standard architecture (ISA) bus, a peripheral component interconnect (PCI) bus, an extended industry standard architecture (EISA) bus, or the like. The bus may be classified into an address bus, a data bus, a control bus, or the like. For ease of representation, the bus in the accompanying drawings of this application is not limited to only one bus or only one type of bus.

In the several embodiments provided in this application, it should be understood that the disclosed apparatus and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware plus a software function unit.

The integrated unit implemented in the form of the software function unit may be stored in a computer-readable storage medium. The software function unit is stored in a storage medium and includes several instructions for instructing a computer device (which may be a personal computer, a server, or a network device) or a processor to perform some of the steps of the methods described in the embodiments of this application. The foregoing storage medium includes: any medium that can store program code, such as a USB flash drive, a removable hard disk, a read-only memory (ROM for short), a random access memory (RAM for short), a magnetic disk, or an optical disc.

What is claimed is:

1. A method, comprising:
   obtaining a first correspondence between service information and a first transmission parameter, wherein the service information comprises any one or more of the following: a service identifier, a ProSe per-packet priority (PPPP) of a service, a ProSe per-packet reliability (PPPR) of a service, or a quality of service flow identifier (QFI), and wherein the first transmission parameter comprises information about an allowed first-type resource and information about an allowed second-type resource, and wherein the allowed first-type resource is a resource preconfigured by a network device, and the allowed second-type resource is a semi-persistent scheduling resource or a dynamic scheduling resource;
   obtaining a transmission resource and a second transmission parameter corresponding to the transmission resource, wherein the second transmission parameter has an association relationship with the first transmission parameter, or the second transmission parameter belongs to the first transmission parameter; and
   allocating, based on the first correspondence and the second transmission parameter corresponding to the transmission resource, the transmission resource to a to-be-transmitted data packet corresponding to the service information.

2. The method according to claim 1, wherein the first transmission parameter comprises any one or more of the following parameters: information about an allowed subcarrier spacing (SCS), information about an allowed cell, information about an allowed frequency, information about a minimum block error rate, or information about an allowed air interface.

3. The method according to claim 1, wherein the first correspondence is prestored in a terminal device, or
   the first correspondence is sent by a network device to the terminal device.

4. The method according to claim 1, wherein the obtaining a second transmission parameter corresponding to the transmission resource comprises:
   receiving indication information that is of the second transmission parameter corresponding to the transmission resource and that is sent by a network device; or
   receiving indication information that is of association information of the second transmission parameter corresponding to the transmission resource and that is sent by the network device; and
   determining, based on the indication information of the association information of the second transmission parameter corresponding to the transmission resource, the second transmission parameter corresponding to the transmission resource.

5. The method according to claim 1, wherein the obtaining a second transmission parameter corresponding to the transmission resource comprises:
   determining, based on the service information of the to-be-transmitted data packet and the first correspondence, a transmission parameter meeting the service information of the to-be-transmitted data packet as the second transmission parameter corresponding to the transmission resource.

6. The method according to claim 1, wherein the obtaining a second transmission parameter corresponding to the transmission resource comprises:
when a terminal device is not in coverage of a network device, determining, a default transmission parameter as the second transmission parameter corresponding to the transmission resource.

7. The method according to claim 4, wherein the obtaining a transmission resource comprises:
receiving information that is about the transmission resource and that is sent by the network device, wherein the transmission resource is a dynamic scheduling resource, the information about the transmission resource is carried on a physical downlink control channel (PDCCH), and the PDCCH further carries a bandwidth part (BWP) identifier, and wherein the method further comprises:
when a terminal device receives the PDCCH, switching, based on the BWP identifier, from a current BWP to a BWP corresponding to the BWP identifier, and starting or restarting a BWP activation timer, wherein the BWP activation timer controls the terminal device to switch from the current BWP to a default BWP or an initial BWP after timeout, and the initial BWP is a BWP used by the terminal device to initially access a cell.

8. An apparatus applied for a vehicle to everything (V2X) communication, comprising:
at least one processor;
one or more memories coupled to the at least one processor and storing programming instructions for execution by the at least one processor to perform operations comprising:
obtaining a first correspondence between service information and a first transmission parameter, wherein the service information comprises any one or more of the following: a service identifier, a ProSe per-packet priority (PPPP) of a service, a ProSe per-packet reliability (PPPR) of a service, or a quality of service flow identifier (QFI), and wherein the first transmission parameter comprises information about an allowed first-type resource and information about an allowed second-type resource, and wherein the allowed first-type resource is a resource preconfigured by a network device, and the allowed second-type resource is a semi-persistent scheduling resource or a dynamic scheduling resource;
obtaining a transmission resource and a second transmission parameter corresponding to the transmission resource, wherein the second transmission parameter has an association relationship with the first transmission parameter, or the second transmission parameter belongs to the first transmission parameter; and
allocating, based on the first correspondence and the second transmission parameter corresponding to the transmission resource, the transmission resource to a to-be-transmitted data packet corresponding to the service information.

9. The apparatus according to claim 8, wherein the first transmission parameter comprises any one or more of the following parameters: information about an allowed subcarrier spacing (SCS), information about an allowed cell, information about an allowed frequency, information about a minimum block error rate, or information about an allowed air interface.

10. The apparatus according to claim 8, wherein the first correspondence is prestored in a terminal device, or the first correspondence is sent by a network device to the terminal device.

11. The apparatus according to claim 8, wherein the obtaining a second transmission parameter corresponding to the transmission resource comprises:
receiving indication information that is of the second transmission parameter corresponding to the transmission resource and that is sent by a network device; or
receiving indication information that is of association information of the second transmission parameter corresponding to the transmission resource and that is sent by the network device; and
determining, based on the indication information of the association information of the second transmission parameter corresponding to the transmission resource, the second transmission parameter corresponding to the transmission resource.

12. The apparatus according to claim 8, wherein the obtaining a second transmission parameter corresponding to the transmission resource comprises:
determining, based on the service information of the to-be-transmitted data packet and the first correspondence, a transmission parameter meeting the service information of the to-be-transmitted data packet as the second transmission parameter corresponding to the transmission resource.

13. The apparatus according to claim 8, wherein the obtaining a second transmission parameter corresponding to the transmission resource comprises:
when a terminal device is not in coverage of a network device, determining, a default transmission parameter as the second transmission parameter corresponding to the transmission resource.

14. The apparatus according to claim 11, wherein the obtaining a transmission resource comprises:
receiving information that is about the transmission resource and that is sent by the network device, wherein the transmission resource is a dynamic scheduling resource, the information about the transmission resource is carried on a physical downlink control channel PDCCH, and the PDCCH further carries a bandwidth part BWP identifier, and wherein the operations further comprise:
when a terminal device receives the PDCCH, switching, based on the BWP identifier, from a current BWP to a BWP corresponding to the BWP identifier, and starting or restarting a BWP activation timer, wherein the BWP activation timer controls the terminal device to switch from the current BWP to a default BWP or an initial BWP after timeout, and the initial BWP is a BWP used by the terminal device to initially access a cell.

15. A non-transitory computer-readable media storing computer instructions, that when executed by one or more processors, cause the one or more processors to perform steps comprising:
obtaining a first correspondence between service information and a first transmission parameter, wherein the service information comprises any one or more of the following: a service identifier, a ProSe per-packet priority (PPPP) of a service, a ProSe per-packet reliability (PPPR) of a service, or a quality of service flow identifier (QFI), and wherein the first transmission parameter comprises information about an allowed first-type resource and information about an allowed second-type resource, and wherein the allowed first-type resource is a resource preconfigured by a network device, and the allowed second-type resource is a semi-persistent scheduling resource or a dynamic scheduling resource;

obtaining a transmission resource and a second transmission parameter corresponding to the transmission resource, wherein the second transmission parameter has an association relationship with the first transmission parameter, or the second transmission parameter belongs to the first transmission parameter; and allocating, based on the first correspondence and the second transmission parameter corresponding to the transmission resource, the transmission resource to a to-be-transmitted data packet corresponding to the service information.

16. The non-transitory computer-readable media according to claim 15, wherein the first transmission parameter comprises any one or more of the following parameters: information about an allowed subcarrier spacing (SCS), information about an allowed cell, information about an allowed frequency, information about a minimum block error rate or information about an allowed air interface.

17. The non-transitory computer-readable media according to claim 15, wherein the first correspondence is prestored in a terminal device, or the first correspondence is sent by a network device to the terminal device.

18. The non-transitory computer-readable media according to claim 15, wherein the obtaining a second transmission parameter corresponding to the transmission resource comprises:

receiving indication information that is of the second transmission parameter corresponding to the transmission resource and that is sent by a network device; or receiving indication information that is of association information of the second transmission parameter corresponding to the transmission resource and that is sent by the network device; and determining, based on the indication information of the association information of the second transmission parameter corresponding to the transmission resource, the second transmission parameter corresponding to the transmission resource.

19. The non-transitory computer-readable media according to claim 15, wherein the obtaining a second transmission parameter corresponding to the transmission resource comprises:

determining, based on the service information of the to-be-transmitted data packet and the first correspondence, a transmission parameter meeting the service information of the to-be-transmitted data packet as the second transmission parameter corresponding to the transmission resource.

20. The non-transitory computer-readable media according to claim 15, wherein the obtaining a second transmission parameter corresponding to the transmission resource comprises:

when a terminal device is not in coverage of a network device, determining, by the terminal device, a default transmission parameter as the second transmission parameter corresponding to the transmission resource.

\* \* \* \* \*

UNITED STATES PATENT AND TRADEMARK OFFICE
CERTIFICATE OF CORRECTION

PATENT NO. : 12,225,437 B2  
APPLICATION NO. : 17/181727  
DATED : February 11, 2025  
INVENTOR(S) : Chunhua You et al.

Page 1 of 1

It is certified that error appears in the above-identified patent and that said Letters Patent is hereby corrected as shown below:

In the Claims

In Column 39, In Line 46-47, In Claim 8, delete "semi- persistent" and insert -- semi-persistent --.

In Column 41, In Line 2-3, In Claim 15, delete "semi- persistent" and insert -- semi-persistent --.

In Column 41, In Line 23, In Claim 16, after "rate" insert -- . --.

Signed and Sealed this  
Fifteenth Day of July, 2025

Coke Morgan Stewart  
*Acting Director of the United States Patent and Trademark Office*